US011434401B2

(12) United States Patent
Valeri

(10) Patent No.: US 11,434,401 B2
(45) Date of Patent: Sep. 6, 2022

(54) OPTICAL ADHESIVE FOR GLASS AND POLYCARBONATE

(71) Applicant: Essilor International, Charenton-le-Pont (FR)

(72) Inventor: Robert Valeri, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 511 days.

(21) Appl. No.: 16/607,406

(22) PCT Filed: Apr. 25, 2018

(86) PCT No.: PCT/EP2018/060593
§ 371 (c)(1),
(2) Date: Oct. 23, 2019

(87) PCT Pub. No.: WO2018/197561
PCT Pub. Date: Nov. 1, 2018

(65) Prior Publication Data
US 2020/0095487 A1  Mar. 26, 2020

(30) Foreign Application Priority Data

Apr. 26, 2017  (EP) .................................... 17305467

(51) Int. Cl.
*C09J 175/14* (2006.01)
*B32B 7/12* (2006.01)
(Continued)

(52) U.S. Cl.
CPC ............... *C09J 175/14* (2013.01); *B32B 7/12* (2013.01); *C08G 18/6755* (2013.01);
(Continued)

(58) Field of Classification Search
CPC .......... B32B 2307/412; B32B 2551/00; B32B 27/365; B32B 7/12; C08F 220/1811;
(Continued)

(56) References Cited

U.S. PATENT DOCUMENTS

| 4,763,312 A | 8/1988 | Tokunaga et al. |
| 5,013,631 A | 5/1991 | Su |

(Continued)

FOREIGN PATENT DOCUMENTS

| CN | 1324389 A | 11/2001 |
| CN | 102533206 A | 7/2012 |

(Continued)

OTHER PUBLICATIONS

International Search Report dated Jun. 8, 2018 in PCT/EP2018/060593 filed Apr. 25, 2018.

(Continued)

*Primary Examiner* — Philip C Tucker
*Assistant Examiner* — Brian R Slawski
(74) *Attorney, Agent, or Firm* — Oblon, McClelland, Maier & Neustadt, L.L.P.

(57) ABSTRACT

Disclosed are UV curable adhesive compositions and methods to adhere polycarbonate substrates containing UV absorbers to glass for use in ophthalmic lenses.

15 Claims, 3 Drawing Sheets

(51) Int. Cl.
  C08G 18/67 (2006.01)
  C08G 18/81 (2006.01)
  C08J 5/12 (2006.01)
  C09J 5/00 (2006.01)
  C09J 11/06 (2006.01)
  G02C 7/10 (2006.01)
  G02C 7/14 (2006.01)
  B29C 65/00 (2006.01)
  B29C 65/52 (2006.01)
  B29C 65/48 (2006.01)

(52) U.S. Cl.
  CPC ............ *C08G 18/815* (2013.01); *C08J 5/128* (2013.01); *C09J 5/00* (2013.01); *C09J 11/06* (2013.01); *B29C 65/4845* (2013.01); *B29C 65/4855* (2013.01); *B29C 65/52* (2013.01); *B29C 66/345* (2013.01); *B29C 66/73366* (2013.01); *B29C 66/7465* (2013.01); *B32B 2307/412* (2013.01); *B32B 2551/00* (2013.01); *C08J 2369/00* (2013.01); *C08J 2475/14* (2013.01); *C09J 2301/416* (2020.08); *C09J 2469/008* (2013.01); *C09J 2475/00* (2013.01); *G02C 7/102* (2013.01); *G02C 7/14* (2013.01)

(58) Field of Classification Search
  CPC ............ C08F 220/20; C08F 222/1065; C08G 18/6755; C08G 18/815; C08J 2369/00; C08J 2475/14; C08J 5/128; C08L 33/08; C09J 11/06; C09J 175/14; C09J 2301/312; C09J 2301/416; C09J 2469/008; C09J 2475/00; C09J 4/00; C09J 5/00; G02B 1/04; G02B 1/041; G02B 3/0062; G02B 5/23; G02C 2202/16; G02C 7/102; G02C 7/14; B29C 65/00; B29C 65/48; B29C 65/4845; B29C 65/4855; B29C 65/52; B29C 66/345; B29C 66/73366; B29C 66/7465
  USPC ..... 156/60, 99, 102, 242, 245, 272.2, 275.5, 156/275.7, 295, 331.7, 332; 264/1.32, 1.7
  See application file for complete search history.

(56) References Cited

U.S. PATENT DOCUMENTS

| | | | | |
|---|---|---|---|---|
| 5,686,169 | A | * 11/1997 | Hassall | .................. G02B 30/27 428/343 |
| 6,337,118 | B1 | * 1/2002 | Takehana | .................. C09J 4/06 430/945 |
| 2003/0045599 | A1 | 3/2003 | Khudyakov et al. | |
| 2007/0138667 | A1 | 6/2007 | Dang et al. | |
| 2009/0011122 | A1 | 1/2009 | Dang et al. | |
| 2009/0029100 | A1 | * 1/2009 | Wigdorski | ............ B29C 66/345 156/583.1 |
| 2010/0261018 | A1 | 10/2010 | Turshani et al. | |
| 2012/0172481 | A1 | 7/2012 | Ha et al. | |
| 2012/0177912 | A1 | * 7/2012 | Kim | ........................ C09J 175/16 428/332 |
| 2013/0082577 | A1 | * 4/2013 | Kim | .................... G11B 19/2009 522/79 |
| 2013/0230706 | A1 | 9/2013 | Turshani et al. | |

FOREIGN PATENT DOCUMENTS

| | | |
|---|---|---|
| CN | 102850928 A | 1/2013 |
| EP | 1 112 330 A1 | 7/2001 |
| JP | 58-136672 A | 8/1983 |
| JP | 2000-63766 A | 2/2000 |
| JP | 2015-522667 A | 8/2015 |
| WO | WO 2013/173977 A1 | 11/2013 |

OTHER PUBLICATIONS

European Search Report dated Sep. 12, 2017 in European Application 17305467.7 filed Apr. 26, 2017, 8 pages.
Combined Chinese Office Action and Search Report dated Feb. 23, 2021 in Chinese Patent Application No. 201880027475.6 (with English translation), 21 pages.
Japanese Office Action dated Dec. 24, 2021 in Japanese Patent Application No. 2019-556696 (submitting English translation only), 6 pages.

* cited by examiner

OPTICAL ADHESIVE FOR GLASS AND POLYCARBONATE

CROSS REFERENCE TO RELATED APPLICATIONS

None.

BACKGROUND OF THE INVENTION

A. Field of the Invention

The invention generally concerns optical adhesives developed to permanently adhere organic optical elements to a glass element to form optical lenses. Particularly, the invention concerns colorless UV-curable adhesives necessary to add optical elements having power to an active optical element with no optical power to make curved ophthalmic lenses.

B. Description of Related Art

UV curable adhesives are known in the art. Polycarbonate (PC) that is typically used in optical products contains UV absorbers that can block UV radiation passing through polycarbonate required to cure a UV adhesive. Further curing of a UV-curable adhesive through the photochromic coating also presents issues as photochromic coatings also absorb and block varying wavelengths of UV radiation. Thus, the increased power and duration of radiation application required to cure a UV adhesive through a polycarbonate lens or optical wafer with or without a photochromic coating leads to increased heating of the assembly which can cause optical distortion and damage of the glass optical element and/or polycarbonate optical element. Therefore, an appropriate UV adhesive for use in optical products must be curable through both a photochromic coating and a PC wafer, both containing UV absorbers. Additionally, commercial UV curable adhesives, such as glues from Dymax Corporation, CT, USA, inadequately adhere PC wafers to glass. An optically clear UV adhesive is therefore needed that can permanently adhere thin optical wafers to one or both sides of a glass element without affecting optical power.

SUMMARY OF THE INVENTION

A discovery has been made that provides a solution to the problems associated with curing UV adhesives through optical materials containing UV absorbers. In particular, the UV-curable adhesives of the present invention can be fully cured through polycarbonate-containing UV absorber that is further coated with UV-absorbing photochromic coating without affecting the thin polycarbonate optical wafers that are susceptible to changes in optical power when subjected to heat. The disclosed adhesives have beneficial properties over commercially available UV curable adhesives. Glued assemblies (PC/UV glue/Glass/UV glue/PC) do not delaminate during 10 hour thermal cycling from −18° C. to 60° C. every 30 minutes, adhesion is stronger than the adhered glass such that the 2 mm thick glass breaks under compression before any sign of glue delamination, and there is no evidence of evolution of yellowness or delamination during accelerated aging or tropical storage testing.

In one embodiment of the present invention, there is disclosed a photocurable adhesive for permanently adhering an uncoated polycarbonate substrate or a hard-coated polycarbonate substrate and a glass substrate comprising: a) at least one urethane acrylate oligomer in an amount ranging from about 50 to about 75 wt. %; b) at least one alkyl acrylate or diacrylate monomer in an amount ranging from about 10 to about 25 wt. %; c) at least one hydroxy-functional acrylic monomer in an amount ranging from about 8 to about 25 wt. %; and d) at least one free-radical generating initiator in an amount ranging from about 5 to about 9.5 wt. %. In one aspect, the urethane acrylate oligomer can be selected from the group consisting of aliphatic urethane acrylate oligomers, aliphatic polyether-based urethane acrylate oligomers, aromatic polyether based urethane acrylate oligomers, and aliphatic polyester based urethane acrylate oligomers. In other aspects, at least one alkyl acrylate or diacrylate monomer can be selected from the group consisting of isobornyl acrylate (IBOA), isobornyl methacrylate (IBMA), 1,6-hexanediol diacrylate (HDDA), and phenoxyethyl acrylate (PEA). The at least one hydroxy-functional acrylate monomer can be selected from the group consisting of hydroxyethyl methacrylate (HEMA), hydroxyethyl acrylate (HEA), hydroxypropyl methacrylate (HPMA), and hydroxypropyl acrylate (HPA). In particular aspects of the present invention, the at least one free radical generating initiator is a photoinitiator. The photoinitiator can be selected from the group consisting of benzophenone derivatives and acetophenone derivatives and a ratio of benzophenone derivatives to acetophenone derivatives can be between 70:30 and 90:10 and all ratio there between, including 71:29, 72:28, 73:27, 74:26, 75:25, 76:24, 77:23, 78:22, 79:21, 80:20, 81:19, 82:18, 83:17, 84:16, 85:15, 86:14, 87:13, 88:12, or 89:11, preferably between 75:25 and 85:15. In one instance, the alkyl acrylate or diacrylate monomer can be used as a reactive diluent and/or promote polycarbonate adhesion. In another instance, the hydroxyfunctional acrylate monomer promotes glass adhesion and the adhesive can be essentially or substantially free of solvent. In some aspects, the adhesive can include an optional polyester oligomer. The optional polyester oligomer can be selected from the group consisting of a chlorinated polyester oligomer and an acrylated polyester oligomer.

In another embodiment, a method to prepare an optical article is described. The method can include the steps: a) applying the photocurable adhesive of the present invention to a first face of the polycarbonate substrate and to a first face of the glass substrate; b) joining the adhesive of the first face of the polycarbonate substrate and the adhesive of the first face of the glass substrate horizontally such that the polycarbonate substrate is above the glass substrate; c) allowing the adhesive to spread under the weight of the polycarbonate substrate until the adhesive fills the space between the substrate faces; d) applying a first UV radiation through the polycarbonate substrate for a period of time to gel the photocurable adhesive; and e) applying a second UV radiation through the polycarbonate substrate for a period of time to set the photocurable adhesive. In one aspect, the method provides a permanently adhered optical article with beneficial properties. Specifically, the photocurable adhesive can be spread by gravitational force until it reaches an edge of the first faces of the joined polycarbonate and glass substrates as to minimize bubble formation and adhesive unevenness. In some aspects, the joined polycarbonate and glass substrates are compressed under vacuum before treatment with UV radiation Also disclosed in the context of the present invention are embodiments 1-26. Embodiment 1 is a photocurable adhesive for permanently adhering an uncoated polycarbonate substrate or a hard coated polycarbonate substrate and a glass substrate comprising: a) at least one urethane acrylate oligomer in an amount ranging from about 50 to about 75 wt. %; b) at least one alkyl acrylate or diacrylate monomer in an amount ranging from about 10 to about 25 wt. %; c) at least one hydroxy-functional acrylic monomer in an amount ranging from about 8 to about 25 wt. %; and d) at least one free-radical generating initiator in an amount ranging from about 5 to about 9.5 wt. %. Embodiment 2 is the photocurable adhesive of embodiment 1, wherein the urethane acrylate oligomer is selected from the group consisting of aliphatic urethane acrylate oligomers, aliphatic polyether based urethane acrylate oligomers, aromatic polyether based urethane acrylate oligomers, and aliphatic polyester based urethane acrylate oligomers. Embodiment 3 is the photocurable adhesive of either embodiments 1 or 2, wherein the at least one alkyl acrylate or diacrylate monomer is selected from the group consisting of isobornyl acrylate (IBOA), isobornyl methacrylate (IBMA), 1,6-hexanediol diacrylate (HDDA), and phenoxyethyl acrylate (PEA). Embodiment 4 is the photocurable adhesive of any of embodiments 1 to 3, wherein the at least one hydroxy-functional acrylate monomer is selected from the group consisting of hydroxyethyl methacrylate (HEMA), hydroxyethyl acrylate (HEA), hydroxypropyl methacrylate (HPMA), and hydroxypropyl acrylate (HPA). Embodiment 5 is the photocurable adhesive of any of embodiments 1 to 4, wherein the at least one free radical generating initiator is a photoinitiator. Embodiment 6 is the photocurable adhesive of embodiment 5, wherein the photoinitiator is selected from the group consisting of benzophenone derivatives and acetophenone derivatives. Embodiment 7 is the photocurable adhesive of embodiment 6, wherein a ratio of benzophenone derivatives to acetophenone derivatives is between 70:30 and 90:10 and all ratio there between, including 71:29, 72:28, 73:27, 74:26, 75:25, 76:24, 77:23, 78:22, 79:21, 80:20, 81:19, 82:18, 83:17, 84:16, 85:15, 86:14, 87:13, 88:12, or 89:11, preferably between 75:25 and 85:15. Embodiment 8 is the photocurable adhesive of any of embodiments 1 to 7, wherein the amount of said urethane acrylate oligomer ranges from about 52 to about 70 wt. % relatively to the total weight of said photocurable adhesive. Embodiment 9 is the photocurable resin adhesive any of embodiments 1 to 8, wherein the amount of said alkyl acrylate or diacrylate monomer ranges from about 15 to about 22 wt. % relatively to the total weight of said photocurable adhesive. Embodiment 10 is the photocurable adhesive of any of embodiments 1 to 9, wherein the amount of said hydroxy-functional acrylic monomer ranges from about 8 to about 10 wt. % relatively to the total weight of said photocurable adhesive. Embodiment 11 is the photocurable adhesive of any of embodiments 1 to 10, wherein the adhesive is substantially free of solvent. Embodiment 12 is the photocurable adhesive of any of embodiments 1 to 11, wherein the adhesive further comprises a polyester oligomer. Embodiment 13 is the photocurable adhesive of embodiment 12, wherein the optional polyester oligomer is selected from the group consisting of a chlorinated polyester oligomer and an acrylated polyester oligomer. Embodiment 14 is a method to prepare an optical article, comprising the steps: a) applying the photocurable adhesive of any of embodiments 1 to 13 to a first face of the polycarbonate substrate and to a first face of the glass substrate; b) joining the adhesive of the first face of the polycarbonate substrate and the adhesive of the first face of the glass substrate horizontally such that the polycarbonate substrate is above the glass substrate; c) allowing the adhesive to spread under the weight of the polycarbonate substrate until the adhesive fills the space between the substrate faces; d) applying a first UV radiation through the polycarbonate substrate for a period of time to gel the photocurable adhesive; and e) applying a second UV radiation through the polycarbonate substrate for a period of time to set the photocurable adhesive. Embodiment 15 is the optical article prepared by the method of embodiment 14.

Embodiment 16 is a method to adhere an uncoated polycarbonate substrate or a hard coated polycarbonate substrate and a glass substrate comprising the steps: a) applying a photocurable adhesive to a first face of the polycarbonate substrate; b) applying the photocurable adhesive to a first face of the glass substrate; c) joining the photocurable adhesive of the first face of the polycarbonate substrate and the photocurable adhesive of the first face of the glass substrate horizontally; d) applying a first UV radiation through the polycarbonate substrate for a period of time to gel the photocurable adhesive; and e) applying a second UV radiation through the polycarbonate substrate for a period of time to set the photocurable adhesive. Embodiment 17 is the method of embodiment 16, wherein after step c) and before step d) the photocurable adhesive is spread by gravitational force between the joined faces of the polycarbonate and glass substrates. Embodiment 18 is the method of either embodiments 16 or 17, wherein the first radiation is a low intensity UV radiation applied for less than 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, or 10 seconds, preferably from 20 seconds to 40 seconds, or a high intensity UV radiation applied for 2 seconds, preferably two 1 second flashes, or the high intensity UV radiation applied using a pulsed lamp applied for 4 to 8 seconds, preferably for 6 seconds, and more preferably 3 flashes of 2 seconds each, wherein the pulse rate is between 80 and 120 pulses per second and all pulse rates there between, including 81, 82, 83, 84, 85, 86, 87, 88, 89, 901, 91, 92, 93, 94, 95, 96, 97, 98, 99, 100, 101, 102, 103, 104, 105, 106, 107, 108, 109, 110, 111, 112, 113, 114, 115, 116, 117, 118 and 119 pulses per second, and the duration of each pulse if between 10 and 20 microseconds and all pulse durations there between, including 11, 12, 13, 14, 15, 16, 17, 18, or 19 microseconds. Embodiment 19 is the method of any of embodiments 16 to 18, wherein the second UV radiation is a high intensity UV radiation applied for greater than 60, 61, 62, 63, 64, 65, 66, 67, 68, 69, or 70 seconds, preferably from 60 seconds to 75 seconds and all application times there between, including 61, 62, 63, 64, 65, 66, 67, 68, 69, 70, 71, 72, 73, or 74 seconds. Embodiment 20 is the method of any of embodiments 16 to 19, wherein the low intensity UV radiation has a power rating of less than 60 mW/cm$^2$, preferably from 30 mW/cm$^2$ to 50 mW/cm$^2$ and all powers there between, including 31, 32, 33, 34, 35, 36, 37, 38, 39, 40, 41, 42, 43, 44, 45, 46, 47, 48, or 49 mW/cm$^2$, and the high intensity UV radiation has a power rating of greater than 60, 61, 62, 63, 64, 65, 66, 67, 68, 69, 70, 71, 72, 73, 74, 75, 76, 77, 78, or 79 mW/cm$^2$, preferably from 80 mW/cm$^2$ to 95 mW/cm$^2$ and all powers there between, including 81, 82, 83, 84, 85, 86, 87, 88, 89, 91, 92, 93, and 94 mW/cm$^2$.

Embodiment 21 is a method to adhere an uncoated polycarbonate substrate or a hard coated polycarbonate substrate having a photochromic coating on a second face and a glass substrate comprising the steps: a) applying a photocurable adhesive to a first face of the polycarbonate substrate; b) applying the photocurable adhesive to a first face of the glass substrate; c) joining the photocurable adhesive of the first face of the polycarbonate substrate and the photocurable adhesive of the first face of the glass substrate horizontally; d) applying a first UV radiation through the photochromic coated polycarbonate substrate for a period of time to gel the photocurable adhesive; and e) applying a second UV radiation through the photochromic coated polycarbonate substrate for a period of time to set the photocurable adhesive. Embodiment 22 is the method of embodiment 21, wherein after step c) and before step d) the photocurable adhesive is spread by gravitational force between the joined faces of the polycarbonate and glass substrates. Embodiment 23 is the method of either embodiments 21 or 22, wherein the first radiation is a high intensity UV radiation applied in pulses, wherein the pulses are between 10 and 20 microseconds in duration and all durations there between, including 11, 12, 13, 14, 15, 16, 17, 18, or 19 microseconds at a rate of 50 to 150 pulses per second, preferably about 100 pulses per second applied for less than 10 seconds, preferably from 4 seconds to 8 seconds, most preferably 3 applications of 2 seconds each. Embodiment 24 is the method of any of embodiments 21 to 23, wherein the second UV radiation is a high intensity UV radiation applied in pulses, wherein the pulses are between 10 and 20 microseconds in duration and all durations there between, including 11, 12, 13, 14, 15, 16, 17, 18, or 19 microseconds at a rate of 50 to 150 pulses per second and all pulse rates there between, including 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, or 149 pulses per second, preferably about 100 pulses per second applied for more than 40, 41, 42, 43, or 44 seconds, preferably 45 to 90 seconds, most preferably from 50 seconds to 80 seconds and all application times there between, including 51, 52, 53, 54, 55, 56, 57, 58, 59, 60, 61, 62, 63, 64, 65, 66, 67, 68, 69, 70, 71, 72, 73, 74, 75, 76, 77, 78, or 79 seconds. Embodiment 25 is the method of embodiment 24, wherein each 20 seconds of application is separated by greater than 10, 11, 12, 13, 14, 15, 16, 17, 18, 19, 20, 21, 22, 23, 24, 25, 26, 27, 28, 29, 30, 31, 32, 33, 34, or 35 seconds, preferably from 35 seconds to 40 seconds and all times there between, including 36, 37, 38, or 39 seconds. Embodiment 26 is the method of any of embodiments 21 to 25, wherein the high intensity UV radiation has a power rating of greater than 60, 61, 62, 63, 64, 65, 66, 67, 68, 69, 70, 71, 72, 73, 74, 75, 76, 77, 78, 79, 80, 81, 82, 83, 84, 85, 86, 87, 88 or 89 $mW/cm^2$, preferably from 90 $mW/cm^2$ to 110 $mW/cm^2$ and all powers there between, including 91, 92, 93, 94, 95, 96, 97, 98, 99, 100, 101, 102, 103, 104, 105, 106, 107, 108, or 109 $mW/cm^2$.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The following includes definitions of various terms and phrases used throughout this specification.

The terms "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms increasing or decreasing or any variation of these terms, when used in the claims and/or the specification includes any measurable increase or decrease of a measurable or observable property of the compositions or materials.

The term "effective," as that term is used in the specification and/or claims, means adequate to accomplish a desired, expected, or intended result.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The method and compositions of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the curable adhesives of the present invention are the percentages of photo initiators employed.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

DETAILED DESCRIPTION OF THE INVENTION

Figure 1:
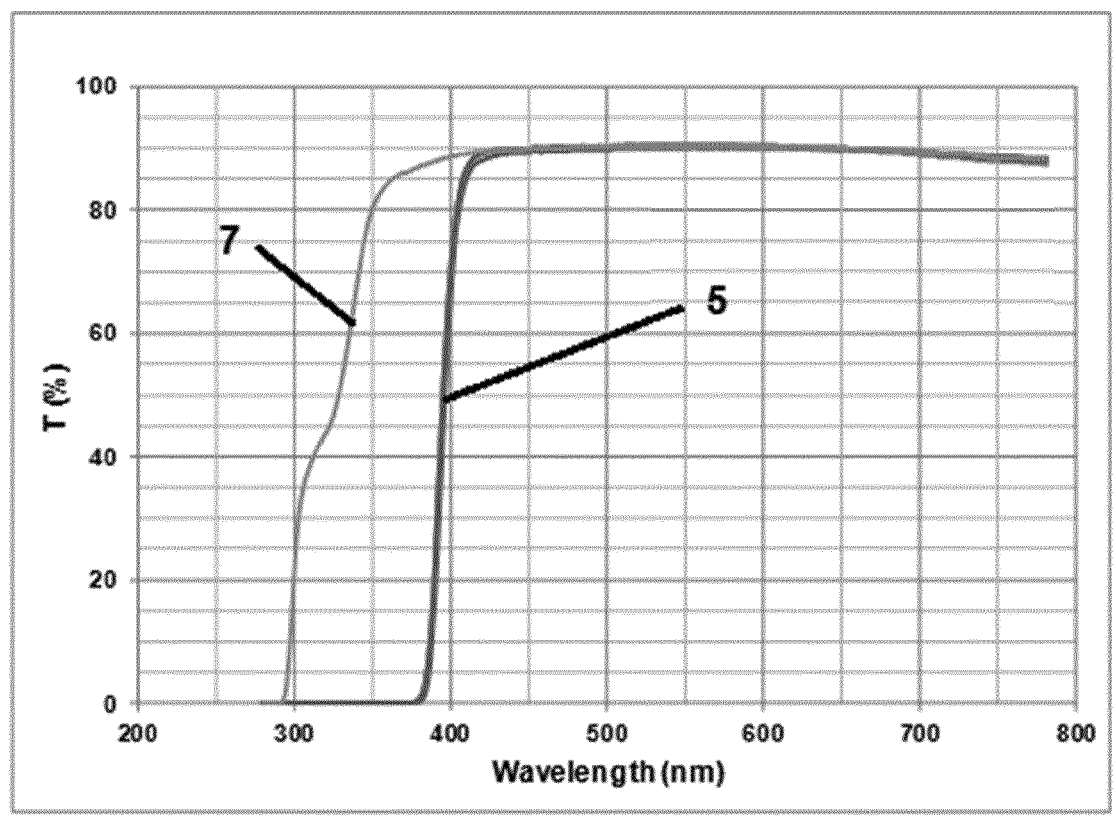
FIG. 1 shows a graphical representation showing the UV cut of a PC resin with and without UV absorber.

A discovery has been made that provides a solution to the problems associated with curing UV adhesives through optical materials containing UV absorber. In particular, the UV-curable adhesives of the present invention can be fully cured through polycarbonate containing UV absorber further coated with a UV absorbing photochromic coating. One advantage of the disclosed UV-curable adhesives over commercially available UV-curable adhesives is that glued assemblies (PC/UV glue/Glass/UV glue/PC) do not delaminate during 10 hour thermal cycling from −18° C. to 60° C. every 30 minutes. Additionally, adhesion is stronger than the adhered glass such that the 2 mm thick glass breaks under compression before any sign of glue delamination and there is no evidence of evolution of yellowness or delamination during accelerated aging or tropical storage testing. Without being limited by theory, the current UV-curable adhesives are prepared to meet specific parameters using specific mixtures of raw materials in specific ratios while also avoiding unacceptable cosmetic defects which would not be factors for consideration during typical bonding situations or using pressure sensitive adhesives (PSA).

These and other non-limiting aspects of the present invention are discussed in further detail in the following sections.

A. UV-Curable Adhesive

While epoxy glues are known to exhibit robust adhesion to glass due to their hydroxyl function, epoxy glues cannot be used because the UV absorbers in the polycarbonate completely block the wavelengths of light needed to activate cationic photoinitiators for epoxy glue curing. Therefore, the formulations of the disclosed UV-curable adhesives were selected to be free-radically cured from acrylate-based compositions. Urethane acrylates are known to the person skilled in the art. They can be obtained by reacting a di- or polyisocyanate with a chain-extending agent from the group of diols/polyols and/or diamines/polyamines and/or dithiols/polythiols and/or alkanolamines and then reacting the remaining free isocyanate groups with at least one hydroxyalkylacrylate or hydroxyalkyl ester of other ethylenically unsaturated carboxylic acids. This current adhesive composition uses, for example, mixtures of soluble urethane acrylates and/or methacrylates with photopolymerizable monomers, for example acrylamides and/or methacrylamides, or acrylates and/or methacrylates, and one or more photoinitiator. Urethane acrylates were found to be a preferred free-radically curable resins for adhesion to glass and polycarbonate due their polarity and flexibility. Preferably the urethane acrylate is a aliphatic urethane acrylate. Suitable aliphatic groups are, for example, straight-chain or branched $C_1$-$C_{12}$ alkyl, preferably $C_1$-$C_6$ alkyl and particularly preferably $C_1$-$C_4$ alkyl groups. These include, in particular, methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methyl propyl, n-heptyl, 2-heptyl, 3-heptyl, 2-ethyl pentyl, 1-propylbutyl, octyl etc. Other variations include urethane oligomers that can contain multiple acrylate and/or methacrylate groups. Non-limiting urethane oligomers include aliphatic urethane acrylate oligomers, aliphatic polyether based urethane acrylate oligomers, aromatic polyether based urethane acrylate oligomers, and aliphatic polyester based urethane acrylate oligomers. Suitable examples of urethane oligomers that can be used in the present invention include aromatic polyether based urethane triacrylate oligomers (i.e., Sartomer CN972), urethane acrylate oligomers (i.e., Sartomer CN9018 and/or Sartomer CN9031), acrylic ester di-functional aliphatic urethane acrylate oligomers (i.e., Sartomer CN9021), or aliphatic polyester based urethane diacrylate oligomer blend (i.e., Sartomer CN966J75). Commercial Sartomer urethane oligomers are available from Sartomer Americas, Inc., PA. Sartomer CN966J75 is a 75% proprietary aliphatic urethane acrylate dispersed in 25% isobornyl acrylate. The amount of urethane acrylate oligomer in the UV curable adhesive composition is generally between 50% to 75% based on the weight of the composition and any amount there between, including 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, or 74%. Specifically the amount of urethane acrylate oligomer in the UV curable adhesive composition is between 52 and 70% based on the weight of the composition.

In another aspect of the current UV-curable adhesive composition, it was necessary to incorporate a hydroxyl functionality for robust adhesion to glass, an aromatic functionality for robust adhesion to polycarbonate, and an additional acrylate to act as a reactive diluent and to avoid attack (hazing) of the polycarbonate during prolonged exposure. The hydroxy-functionalized monomers can be, for example, 2-hydroxyethyl acrylate (HEA), 2-hydroxyethyl methacrylate (HEMA), 2-hydroxypropyl acrylate (HPA), 2-hydroxypropyl methacrylate (HPMA) and the like. The amount of hydroxy-functionalized monomers in the UV curable adhesive composition is generally between 8% to 25% based on the weight of the composition and any amount there between, including 08.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9%, 15.0%, 15.1%, 15.2%, 15.3%, 15.4%, 15.5%, 15.6%, 15.7%, 15.8%, 15.9%, 16.0%, 16.1%, 16.2%, 16.3%, 16.4%, 16.5%, 16.6%, 16.7%, 16.8%, 16.9%, 17.0%, 17.1%, 17.2%, 17.3%, 17.4%, 17.5%, 17.6%, 17.7%, 17.8%, 17.9%, 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, 19.9%, 20.0%, 20.1%, 20.2%, 20.3%, 20.4%, 20.5%, 20.6%, 20.7%, 20.8%, 20.9%, 21.0%, 21.1%, 21.2%, 21.3%, 21.4%, 21.5%, 21.6%, 21.7%, 21.8%, 21.9%, 22.0%, 22.1%, 22.2%, 22.3%, 22.4%, 22.5%, 22.6%, 22.7%, 22.8%, 22.9%, 23.0%, 23.1%, 23.2%, 23.3%, 23.4%, 23.5%, 23.6%, 23.7%, 23.8%, 23.9%, 24.0%, 24.1%, 24.2%, 24.3%, 24.4%, 24.5%, 24.6%, 24.7%, 24.8%, or 24.9% based on the weight of the composition. Specifically the amount of hydroxy-functionalized monomers in the UV curable adhesive composition is between 8 and 10% based on the weight of the composition.

The aromatic functionalized monomers can be, for example, benzyl acrylate and/or methacrylate, methoxybenzyl acrylate and/or methacrylate, chlorobenzyl acrylate and/or methacrylate, furfuryl acrylate and/or methacrylate, phenoxyethyl acrylate and/or methacrylate, aryl acrylate and/or methacrylate (for example, phenyl acrylate and/or methacrylate, cresyl acrylate and/or methacrylate, and naphthyl acrylate and/or methacrylate) and/or the like. The amount of aromatic functionalized monomers in the UV curable adhesive composition is generally between 0% to 13% based on the weight of the composition and any amount there between, including 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, or 14.9% based on the weight of the composition. Specifically the amount of aromatic functionalized monomers in the UV-curable adhesive composition is between 5 and 10% based on the weight of the composition.

Reactive diluents can also be used to control the viscosity of the adhesive formulation to facilitate application of the formulation to a substrate at room temperature. The additional acrylate to act as a reactive diluent in the UV-curable adhesive can be, for example, a wide variety of free-radically polymerizable monomers such as mono-acrylates and/or methacrylates such as methyl acrylate and/or methacrylate, ethyl acrylate and/or methacrylate, isopropyl acrylate and/or methacrylate, isooctyl acrylate and/or methacrylate, isobornyl acrylate and/or methacrylate, n-hexyl acrylate and/or methacrylate, stearyl acrylate and/or methacrylate, allyl acrylate and/or methacrylate, tetrahydrofurfuryl acrylate and/or methacrylate, 2(2-ethoxyethoxy)ethyl acrylate and/or methacrylate, 1,6-hexanediol diacrylate and/or dimethacrylate, 2-phenoxyethyl acrylate and/or methacrylate, ethoxylated nonyl phenol acrylate and/or methacrylate, or copolymerizable mixtures of acrylated monomers and/or acrylated oligomers, and/or the like. The amount of reactive diluents in the UV curable adhesive composition is generally between 0% to 20% based on the weight of the composition and any amount there between, including 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9% 15.0%, 15.1%, 15.2%, 15.3%, 15.4%, 15.5%, 15.6%, 15.7%, 15.8%, 15.9%, 16.0%, 16.1%, 16.2%, 16.3%, 16.4%, 16.5%, 16.6%, 16.7%, 16.8%, 16.9%, 17.0%, 17.1%, 17.2%, 17.3%, 17.4%, 17.5%, 17.6%, 17.7%, 17.8%, 17.9%, 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, or 19.9% based on the weight of the composition. Specifically the amount of reactive diluents in the UV-curable adhesive composition is between 5 and 10% based on the weight of the composition. Increasing the amount of reactive diluents in the UV-curable adhesive composition to above 20% based on the weight of the composition can result in an increase in the glass transition temperature (Tg) of the final adhesive to a point where two substrates bonded together using the adhesive can be pulled apart, such as in a temporary adhesive (i.e., pressure sensitive adhesive (PSA)).

In further aspects, the UV-curable adhesive composition of the current invention optionally includes a polyester oligomer. In one aspect, the polyester oligomer can be a chlorinated polyester oligomer or an acrylated polyester oligomer. Non-limiting examples of chlorinated and acrylated polyester oligomers can include Sartomer CN750 and Sartomer CN790 available from Sartomer Americas, Inc., PA, respectively. In other aspects, the polyester oligomer can be a carboxyl-functional polyester that can be any polyester resin including polymerizable acrylate or methacrylate monomers or oligomers that contains pendant free carboxylic acid, carboxylic acid salt, or carboxylate derivative moieties. A suitable example of carboxyl-functional polyester acrylate resin is Genomer 7151 available from Rahn USA Corp., IL. The amount of polyester oligomer and/or carboxy-functionalized monomers in the UV curable adhesive composition generally is between 0% to 22% based on the weight of the composition and any amount there between, including 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, 10.0%, 10.1%, 10.2%, 10.3%, 10.4%, 10.5%, 10.6%, 10.7%, 10.8%, 10.9%, 11.0%, 11.1%, 11.2%, 11.3%, 11.4%, 11.5%, 11.6%, 11.7%, 11.8%, 11.9%, 12.0%, 12.1%, 12.2%, 12.3%, 12.4%, 12.5%, 12.6%, 12.7%, 12.8%, 12.9%, 13.0%, 13.1%, 13.2%, 13.3%, 13.4%, 13.5%, 13.6%, 13.7%, 13.8%, 13.9%, 14.0%, 14.1%, 14.2%, 14.3%, 14.4%, 14.5%, 14.6%, 14.7%, 14.8%, 14.9%, 15.0%, 15.1%, 15.2%, 15.3%, 15.4%, 15.5%, 15.6%, 15.7%, 15.8%, 15.9%, 16.0%, 16.1%, 16.2%, 16.3%, 16.4%, 16.5%, 16.6%, 16.7%, 16.8%, 16.9%, 17.0%, 17.1%, 17.2%, 17.3%, 17.4%, 17.5%, 17.6%, 17.7%, 17.8%, 17.9%, 18.0%, 18.1%, 18.2%, 18.3%, 18.4%, 18.5%, 18.6%, 18.7%, 18.8%, 18.9%, 19.0%, 19.1%, 19.2%, 19.3%, 19.4%, 19.5%, 19.6%, 19.7%, 19.8%, 19.9%, 20.0%, 20.1%, 20.2%, 20.3%, 20.4%, 20.5%, 20.6%, 20.7%, 20.8%, 20.9%, 21.0%, 21.1%, 21.2%, 21.3%, 21.4%, 21.5%, 21.6%, 21.7%, 21.8%, or 21.9% based on the weight of the composition. Specifically the amount of carboxy-functionalized monomers in the UV curable adhesive composition is between 5 and 10% based on the weight of the composition. Specifically, the amount of polyester oligomers in the UV curable adhesive composition is between 14 and 22% based on the weight of the composition. In other instances, the amount of carboxy-functionalized monomers or polyester oligomers in the UV curable adhesive composition can be reduced or eliminated to prevent certain cosmetic issues and/or possible phase separation during cure. Specifically, when a polyester oligomer is added to the photocurable composition the amount of urethane oligomers can decrease to between 39 and 53% based on the weight of the composition.

Free radical photoinitiators that can be included in the UV-curable adhesive compositions can be selected from those commonly used in UV-curable acrylate systems. Typical photoinitiators used in UV curable compositions include the Irgacure and Darocur product lines from Ciba Specialty Chemical Corp., NY, USA as well as the Omnirad product line from IGM Resins USA Inc., IL. Exemplary curing agents include 1-hydroxy-cyclohexyl-phenyl-ketone, phenylbis(2,4,6-trimethylbenzoyl)phosphine oxide, 2-hydroxy-2-methyl-1-phenyl-1-propanone, 2-benzyl-2-(dimethylamino)-1-(4-morpholinophenyl)-1-butanone, 2,2-dimethoxy-2-phenylacetophenone, 9,10-anthraquinone, 2-methylanthraquinone, 2-ethylanthraquinone, 2-tert-butylanthraquinone, octamethylanthraquinone, 1,4-naphthoquinone, 9,10-phenanthrenequinone, benz(a)anthracene-7,12-dione, 2,3-naphthacene-5,12-dione, 2-methyl-1,4-naphthoquinone, 1,4-dimethyl-anthraquinone, 2,3-dimethylanthraquinone, 2-phenylanthraquinone, 2,3-diphenylanthraquinone, retenequinone, 7,8,9,10-tetrahydro-naphthracene-5,12-dione, and 1,2,3,4-tetra-hydrobenz(a)anthracene-7,12-dione, benzophenone, and derivatives thereof. FIG. 1 shows the UV cut of a PC resin with UV absorber 5 (i.e., 0.1% Tinuvin 360) and without UV absorber 7. Most free radical photoinitiators that are activated by absorbing UV at wavelengths shorter than 380 nm would be blocked from activation by the PC resin. Formulations that work with clear polycarbonate can fail to work with photochromic coated polycarbonate due to added UV absorption of the photochromic coating. The photoinitiators disclosed herein were developed based on cure response using both high and low intensity UV sources and their ability to initiate and cure the adhesive through both polycarbonate and photochromic coatings. Urethane acrylate based UV-curable adhesives containing specific monomers for adhesion to both glass and polycarbonate were developed that can be completely cured through both clear polycarbonate containing UV absorber and photochromic coated polycarbonate, both of which absorb UV, to permanently bond the polycarbonate optical wafers to glass. For this reason, an acylphosphine oxide photoinitiator having UV activation longer than 380 nm was selected for use in the current adhesive composition. Specifically a mixture of 2-hydroxy-2-methyl-1-phenyl-1-propanone and phenylbis(2,4,6-trimethylbenzoyl)phosphine oxide were used in the current adhesive composition. The disclosed mixture and ratios of these free radical photoinitiators offers a unique balance of UV absorption spectra that effectively allows a two-step gel and cure of the UV adhesives using both the gravity gluing process and a gluing process under pressure. Both the ratio of photoinitiators and final concentrations were found based on the most uniform cure of the adhesive chemistry and on the highest adhesive strength as determined by compression testing of glued assemblies. The total amount of free radical photoinitiators in the UV curable adhesive composition is generally between 5% to 9.5% based on the weight of the composition and any amount there between, including 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, %, 9.1%, 9.2%, 9.3%, or 9.4% based on the weight of the composition. Specifically, the amount of 2-hydroxy-2-methyl-1-phenyl-1-propanone in the UV curable adhesive composition is generally between 2% and 9%, preferably between 4% and 8.77% based on the weight of the composition and the amount of phenylbis(2,4,6-trimethylbenzoyl)phosphine oxide in the UV curable adhesive composition generally is between 0.1% and 2.0%, preferably between 0.5% and 1.95% based on the weight of the composition. In some instances, increasing the concentration of photoinitiators in the UV-curable adhesive composition to above 2% of the total weight of the composition may be necessary to cure through photochromic coated polycarbonate without delamination during thermal shock testing.

The UV-curable adhesives disclosed herein can be used to permanently bond polycarbonate or hard coated polycarbonate to glass. It is without limitation that the polycarbonate wafers to be UV cured to glass could be pretreated or coated before adhesion. Exemplary hard coatings include, for example, a primer layer, an aminosilane layer, or a sol-gel coating to prevent scratches, abrasion and reduce handling defects. Since sol-gel coatings have a surface chemistry similar to glass, the glues also exhibit robust adhesion to the sol-gel coated polycarbonate wafers. In some instances, pretreatment can include surface corona and/or plasma treatment that can be used to further increase adhesion. The composition can also be used as an adhesive or an adhesion primer on other substrates such as polycarbonate film, TAC (cellulose triacetate) film, PVA film, and Pebax film. All of the previously mentioned materials are envisioned to be used in the production of ophthalmic lenses. The ophthalmic lenses can also contain a photochromic coating. Without being bound by theory, the UV-curable adhesives could also be used in any industry requiring a radiation curable optically transparent adhesive including in automotive windshields, windows, displays, etc. The adhesives are intended to provide solutions to permanently bond specific substrates together and are not pressure sensitive adhesives (PSA).

Figure 2:
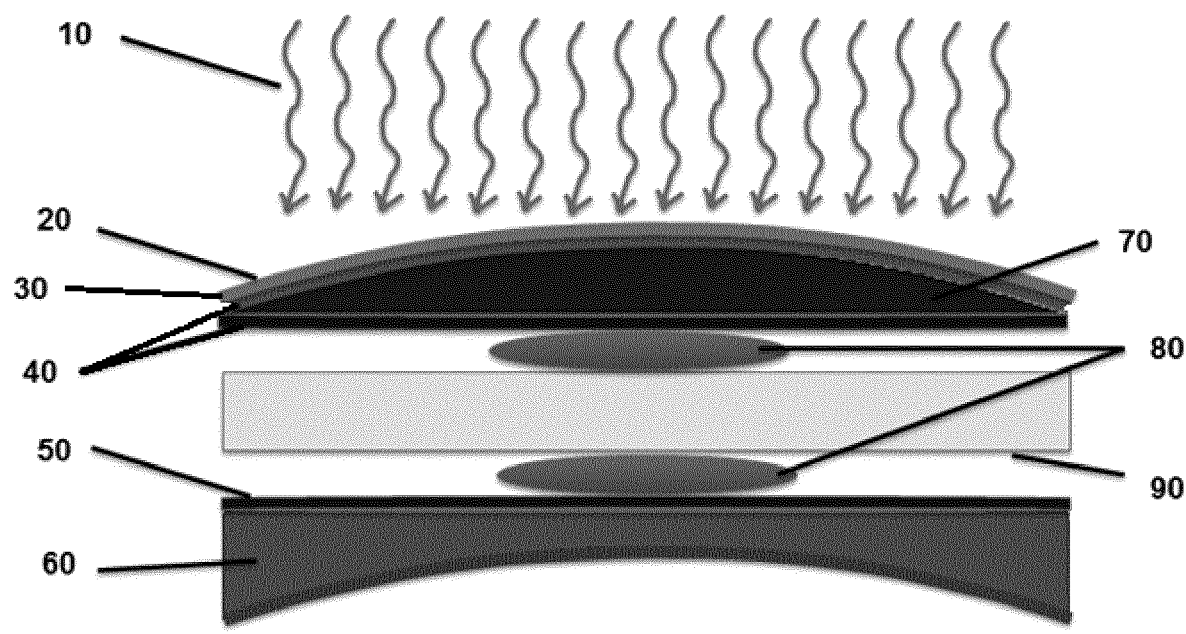
FIG. 2 is a drawing showing the components of an ophthalmic lens in one embodiment of the current invention.

FIG. 2 is a drawing showing the components of an ophthalmic lens that can be adhered together by UV radiation 10 in one embodiment of the current invention. In a non-limiting example, an ophthalmic lens can include an AR/mirror coating 20 on top of a photochromic coating 30 on top of a hard coating 40 coated convex polycarbonate wafer 70. A glass Optical light guide. 90 is sandwiched between the aforementioned convex polycarbonate water 70 and a lower hard coating 50 coated concave polycarbonate wafer 60 by photocurabale adhesive 80.

B. Exemplary Methods to Adhere Polycarbonate to Glass

In a first exemplary embodiment, the adhesion of an uncoated polycarbonate substrate or hard coated polycarbonate substrate and a glass substrate involves first preparing the joined article to be UV cured. The method involves (a) applying a photocurable adhesive to a first face of the polycarbonate substrate, (b) applying the photocurable adhesive to a first face of the glass substrate, (c) joining the photocurable adhesive of the first face of the polycarbonate substrate and the photocurable adhesive of the first face of the glass substrate horizontally, and (d) allowing the photocurable adhesive to spread by the weight of the polycarbonate substrate until the adhesive reaches an edge of the joined substrates. Next, a first UV radiation is applied through the polycarbonate substrate to gel the photocurable adhesive to reduce optical distortion due to glue shrinkage. The first radiation can be a low intensity UV radiation fiber optic UV source, such as a Dymax Blue Wave 200 with an 8 mm light guide applied for less than 60 seconds, preferably from 20 seconds to 40 seconds, or a high intensity UV radiation source, such as a Dymax D3000 lamp with a metal doped Hg bulb applied for 2 seconds, preferably in two 1 second flashes. Alternatively, the high intensity UV radiation can be applied using a Xenon pulsed lamp (e.g., Xenon RC600) that is applied for 4 to 8 seconds, preferably for 6 seconds, and more preferably 3 flashes of 2 seconds each, wherein the pulse rate is between 80 and 120 pulses per second and the duration of each pulse if between 10 and 20 microseconds. The low intensity UV radiation can have a power rating of less than 60 mW/cm$^2$, preferably from 30 mW/cm$^2$ to 50 mW/cm$^2$. After adhesive gelling, a second UV radiation is applied through the polycarbonate substrate to set the photocurable adhesive. The second UV radiation can be a high intensity UV radiation source, such as a Dymax D3000 lamp with a metal doped Hg bulb applied for greater than 60 seconds, preferably from 60 seconds to 75 seconds with a power rating of greater than 60 mW/cm$^2$, preferably from 80 mW/cm$^2$ to 95 mW/cm$^2$. Without being limited to theory, there are many different suppliers that use Hg bulbs doped with different metals to achieve different emission spectra having wavelengths longer than 380 nm that could be used in the current embodiments. Exemplary UV radiation suppliers also include those of Fusion UV Systems, MD using D and V bulbs.

In a second exemplary embodiment, the adhesion of an uncoated polycarbonate substrate or hard coated polycarbonate substrate having a photochromic coating on a second face and a glass substrate involves first preparing the joined article to be UV cured. The method involves (a) applying a photocurable adhesive to a first face of the polycarbonate substrate, (b) applying the photocurable adhesive to a first face of the glass substrate, (c) joining the photocurable adhesive of the first face of the polycarbonate substrate and the photocurable adhesive of the first face of the glass substrate horizontally, and (d) allowing the photocurable adhesive to spread by the weight of the polycarbonate substrate until the adhesive reaches an edge of the joined substrates. Next, a first UV radiation is applied through the photochromic coated polycarbonate substrate to gel the photocurable adhesive to reduce optical distortion due to glue shrinkage. Using a pulsed UV source, such as a Xenon RC600 lamp, revealed that shorter exposure times and reduced heat was possible to achieve the same cure state compared to other high intensity UV radiation sources, such as the aforementioned Dymax D3000 lamp. The first radiation can be a high intensity UV radiation applied in pulses, wherein the pulses are between 10 and 20 microseconds in duration at a rate of 50 to 150 pulses per second, preferably about 100 pulses per second applied for less than 10 seconds, preferably from 4 seconds to 8 seconds, most preferably 3 applications of 2 seconds each. In one aspect, the distance between the adhesive and UV source can dictate the times of UV application since the applied energy decrease as distance increases. Notably, shorter exposure times using the Xenon RC600 pulsed lamp can produce the same total energy as the Dymax D3000 to both gel and cure the adhesive with less heat evolution. The high intensity UV radiation can have a power rating of greater than 60 mW/cm$^2$, preferably from 90 mW/cm$^2$ to 110 mW/cm$^2$. After adhesive gelling, a second UV radiation is applied through the polycarbonate substrate to set the photocurable adhesive. The second UV radiation can be a high intensity UV radiation applied in pulses, wherein the pulses are between 10 and 20 microseconds in duration at a rate of 50 to 150 pulses per second, preferably about 100 pulses per second applied for more than 40 seconds, preferably 45 to 90 seconds, most preferably from 50 seconds to 80 seconds wherein each 20 seconds of application is separated by greater than 10 seconds, preferably from 35 seconds to 40 seconds having a power rating of greater than 60 mW/cm$^2$, preferably from 90 mW/cm$^2$ to 110 mW/cm$^2$.

In either of the above first and second embodiments for a method to adhere an uncoated or hard coated polycarbonate substrate to glass, the joined polycarbonate or photochromic coated polycarbonate and glass substrates are compressed under vacuum and treated with UV radiation. The hard coating of the hard-coated polycarbonate substrate can be a sol-gel coating and either of the exemplary methods can be used to adhere a second uncoated or hard coated polycarbonate substrate or uncoated or hard coated polycarbonate substrate having a photochromic coating on the second face on to the second face of the glass substrate to afford an optical article.

EXAMPLES

The present invention will be described in greater detail by way of specific examples. The following examples are offered for illustrative purposes only and are not intended to limit the invention in any manner Those of skill in the art will readily recognize a variety of noncritical parameters which can be changed or modified to yield essentially the same results.

Several urethane acrylate based UV curable adhesive formulations were developed with robust adhesion to both coated and uncoated polycarbonate and glass. Because the UV absorbers in the polycarbonate completely block the wavelengths of light needed to activate cationic photoinitiators, the formulations were free radically cured. Table 1 show the chemical compositions of the working adhesives.

TABLE 1

| Component Type | Mass (%) | Chemical type | Chemical Name | Range of Composition with polyester oligomer | Range of Composition without polyester oligomer |
|---|---|---|---|---|---|
| Urethane oligomer | 50%-75% | Aromatic polyether based urethane triacrylate oligomer | Sartomer CN972 | 39%-50% | 50%-75% |
| | | Urethane acrylate oligomer | Sartomer CN9018 & CN9031 | | |
| | | Aliphatic polyester based urethane diacrylate oligomer blend | Sartomer CN966J75 | | |
| | | Acrylic ester di-functional aliphatic urethane acrylate oligomer | Sartomer CN9021 | | |

TABLE 1-continued

| Component Type | Mass (%) | Chemical type | Chemical Name | Range of Composition with polyester oligomer | Range of Composition without polyester oligomer |
|---|---|---|---|---|---|
| Polyester oligomer | | Chlorinated polyester oligomer | Sartomer CN750 | 11%-22% | 0% |
| | | Acrylated polyester oligomer | Sartomer CN790 | | |
| Hydroxyfunctional (meth) acrylate(s) | 8%-25% | Hydroxyfunctional (meth)acrylate(s) | Hydroxyethyl methacrylate | | 8%-25% |
| Alkyl (meth) acrylate monomer(s) | 10%-25% | Aromatic (meth)acrylate | Phenoxyethyl acrylate | | 0%-13% |
| | | Cyclic (meth)acrylate | Isobornyl acrylate | | 0%-13% |
| | | (meth)acrylic reactive diluent | 1,6-hexanediol diacrylate | | 0%-10% |
| Free Radical Photoinitiator | 5.0%-9.5% | Free radical photoinitiator | 2-Hydroxy-2-methyl-1-phenyl-1-propanone | | 4.0%-8.77% |
| | | Free radical photoinitiator | Phenyl bis (2,4,6-trimethylbenzoyl) Phosphine oxide | | 0.5%-1.95% |

1. General Methods

To evaluate the materials used in a formulation to be radiation cured through polycarbonate containing UV absorber and exhibit adhesion to both polycarbonate and glass, the following approaches were followed. Materials known to adhere to substrates having —OH (hydroxyl) functionality such as glass were evaluated along with materials known to exhibit good adhesion to thermoplastics such as polycarbonate. The types and concentration of these materials were systematically varied in the glue formulations to achieve adhesion to both substrates. It was hypothesized that flexible —OH (hydroxyl) containing materials should adhere to glass, acrylic monomers and oligomers should form interpenetrating networks with thermoplastics such as polycarbonate, and softer, less highly cross-linked materials should exhibit better adhesion under thermal and mechanical stress such as compression. Adhesion should also be improved as these materials exhibit less shrinkage than the higher functional materials with higher crosslink density. Glue adhesion was tested using a Mecmesin compression tester. 55 mm round polycarbonate wafers were glued to 50 mm round glass discs having a thickness of 2.0 mm. The glued assembly was placed into a stainless steel ring support such that the 2.5 mm outer edge of the polycarbonate was supported by the stainless steel ring with the glued glass disc being unsupported underneath. A stainless probe then applied increasing pressure to the center of the glued polycarbonate wafer which was held by the support ring until the glued glass wafer either delaminated or broke. The glass would only break if the glue strength is stronger than the glass. If the glass was delaminated, the parts were examined to see which material the glue exhibited the best adhesion to and the formulation was modified. Glues that passed the compression adhesion test were then tested by exposing glued assemblies to a 10 hour thermal cycling test where the assemblies were exposed to −18° C. for 30 minutes followed by a +60° C. oven for 30 minutes for a total of 10 cycles. If no delamination occurred, the assemblies were tested with the Mecmesin compression tester to see if there was any degradation of the glue strength. If any defect or delamination occurred during thermal cycling, the formulation was modified and re-tested. Glues that passed compression testing, thermal cycling, and compression after thermal cycling were then evaluated for optics. The final tests were 80 hour Q-Sun exposure and tropical storage to ensure that there was no evolution of yellowness or delamination after accelerated aging. Final formulations were also evaluated for cure and robustness when cured through PC wafers containing UV absorber that had first been coated with a hard coating and various photochromic layers as it would be advantageous to have a product that also encompassed photochromics.

2. Materials

PC Wafer:

The polycarbonate wafers used in the glue evaluations were injection molded with center thicknesses ranging from 1.0 mm to 1.3 mm center thicknesses. The polycarbonate (PC) resin used was a "CD" (compact disc) grade of polycarbonate. It was uncertain if a glue could be formulated that would cure by UV radiation through PC containing UV absorber, therefore, PC resin with and without UV absorber was evaluated. The PC wafers evaluated for adhesion were 1.0 mm bi-plano wafers (optically flat on both sides). Also evaluated were wafers that were optically flat on one side and curved on the opposite side to produce powers ranging from +1.00 to −5.00 diopter, with and without cylinder.

Glass Wafer:

To represent glass optical light guides on the market, to be used in the encapsulated ophthalmic lens, 2 mm polished, round, flat glass wafers were used for all glue testing.

Chemical Nature of UV Glues:

The requirements for the glue composition were that it be UV-curable, have good optics, able to be cured through polycarbonate (preferably containing UV absorber), and exhibit good adhesion to both uncoated polycarbonate and glass. Additional benefits include if the glue would cure through and adhere to hard coated polycarbonate wafers, or the ability to be cured through polycarbonate wafers further coated with photochromic coating(s). Therefore, all radiation curable chemistries were evaluated that were known or suspected to exhibit good adhesion to both glass and polycarbonate. It was discovered early in testing, and by evaluating the UV spectra of the PC wafers containing UV absorber, that materials requiring cationic cure could not be used as the UV absorber in the PC completely blocked the wavelengths of light necessary to initiate the cationic photoinitiators. Therefore, only free radically curable materials were used in the glue formulations. Also, because the UV curable glue would be between a flat glass wafer and a flat PC wafer during cure, the formulation could not contain any volatile materials such as solvents or other materials that could produce gases during cure that would lead to bubbles in the cured assembly.

UV Curable Materials:

Acrylate and methacrylate monomers, urethane acrylates, aromatic urethane oligomers, aliphatic urethane acrylates, polyester acrylate oligomers, etc., were all evaluated alone and in combination to find the best combinations for optical and adhesive properties for polycarbonate and glass. As hypothesized, both acrylic and some urethane acrylate monomers and oligomers were found to exhibit good adhesion to uncoated polycarbonate. Other urethanes including urethane acrylates were found to exhibit better adhesion to glass than polycarbonate. However, the oligomer(s) found to exhibit the best adhesion to glass contained hydroxyl functionality. The best of these were an aliphatic urethane acrylate, a carboxy-functional polyester and a full acrylic oligomer blended with hydroxypropyl acrylate. The best formulations were a mixture of urethane acrylate(s) with acrylic monomers and urethane acrylates with the carboxy-functional polyester and acrylic monomers. The acrylic monomers were used as reactive diluents as well as for adhesion to both glass and polycarbonate. The same glue formulations were tested with both uncoated polycarbonate and polycarbonate wafers coated with sol-gel hard coatings to prevent scratches, abrasion and reduce handling defects. Because the sol-gel coatings have a surface chemistry similar to glass, the glues exhibited robust adhesion to the coated wafers as well.

Photoinitiators:

Only free radical photoinitiators were used as the shorter wavelengths of light needed to activate cationic photoinitiators are blocked by the UV absorber in the polycarbonate. The choice of free radical photoinitiators were made based on their UV absorption spectra and their ability to gel and fully cure the glue chemistry using both the gravity gluing process defined and a gluing process under pressure. Both the ratio of photoinitiators and final concentrations used were arrived at experimentally based on the most uniform cure of the adhesive chemistry and on the highest adhesive strength as determined by compression testing of glued assemblies. Uneven cure, resulting in poor cosmetics, was seen in formulations with a poor balance of photoinitiators due to phase separation of the monomers and oligomer(s).

FIG. 1 is a graphical showing of the UV cut of the PC resin with a UV absorber 5 and without a UV absorber 7 used to make the powered wafers through which the UV curable adhesive had to be cured. As can be seen, all UV below 380 nm is completely blocked by the UV absorber in the PC resin. Therefore, it was necessary to use a photoinitiator or photoinitiator blend that could be activated at wavelengths longer than 380 nm. Because all cationic photoinitiators and most of the common free radical photoinitiators are activated with wavelengths shorter than 380 nm, it was necessary to identify a photoinitiator or photoinitiator blend that was capable of being activated using wavelengths longer than 380 nm. Acylphosphine oxide photoinitiators were found to contain these properties and Irgacure 819 [bis(2,4,6-trimethylbenzoyl)-phenylphosphine oxide] was selected.

Solvent-Borne Versus 100% Solids:

Due to the glue curing between glass and polycarbonate, it was necessary to use a 100% solids formulation to prevent evolution of solvent or other gases that would produce bubbles or other defects.

Photochromics:

It was desirable to use wafers on the convex side of the assembly further coated with a photochromic coating for outdoor use. Curing of the UV curable glue through the photochromic coating presented problems as the photochromic coating absorbs and blocks most UV radiation. Therefore, it was necessary to modify the photoinitiator concentration and use longer exposure times for both the "Pre-flash" and the final cure of the convex side of the assemblies utilizing photochromics on the convex wafers.

3. Equipment and Processes

Glass and Polycarbonate Surface Preparation:

Both the injection molded polycarbonate wafers and the polished glass wafers were hand wiped with isopropyl alcohol to remove any greases or oils followed by hand washing with a dilute water solution of dish detergent followed by a tap water and deionized water rinse and filtered air dry.

Glue Application "Gravity Gluing":

Approximately 0.40 ml of glue was applied to the center of a 2 mm thick polished glass wafer 50 mm in diameter. One drop of the same glue was then applied to the center of the polycarbonate wafer, 55 mm in diameter. With the glass resting on a level horizontal platform, the polycarbonate wafer was placed on top of the glass such that the glue on the glass and the glue on the polycarbonate were joined to prevent creation of bubbles. The polycarbonate was then slowly released allowing the weight of the polycarbonate to spread the glue. After a specified time, depending on the diameter of the wafers and the viscosity of the glue, the glue would spread to the edge of the glass wafer using only the weight of the polycarbonate. The glue was then UV cured. The assembly was exposed to a short UV "pre-flash" cure to gel the glue prior to exposing the assembly to the final UV cure. This was done to reduce optical distortion due to shrinkage of the glue.

Glue Application—"Under Pressure":

Approximately 0.40 ml of glue was applied to the center of a 2 mm thick polished glass wafer 50 mm in diameter. One drop of the same glue was then applied to the center of the polycarbonate wafer, 55 mm in diameter. With the glass resting on a level horizontal platform, the polycarbonate wafer was placed on top of the glass such that the glue on the glass and the glue on the polycarbonate were joined to prevent creation of bubbles. After a specified time, depending on the diameter of the wafers and the viscosity of the glue, the glue spread to the edge of the glass wafer. The assembly was placed within a stainless steel ring having a rubber gasket that was connected to a vacuum source. A thin plastic film was placed over the ring such that it covered the assembly and rested on the rubber gasket. When a vacuum was pulled, the plastic exerted a uniform pressure on the PC wafer of the glued assembly. Because the plastic film was transparent it was possible to cure the assembly through the plastic while under pressure which helped to reduce any distortion during cure. The assembly was exposed to an initial UV "pre-flash" cure to gel the glue prior to exposing the assembly to the final UV cure. This was done to reduce optical distortion due to shrinkage of the glue.

Radiation Curing—"Pre-Flash" and Final Cure Using Clear Coated and Uncoated PC Wafers:

Since the glass is encapsulated between two polycarbonate powered wafers, it was necessary to cure the glue through the powered polycarbonate sides of the assembly. Optical measurements of the wafer/glass assembly prior to cure and after cure showed that both optical power and cylinder could be influenced by the cure method of the glue due to shrinkage of the glue components. It was found that these distortions of optical power and cylinder could be managed (reduced or eliminated) by first gelling the UV glue to a point that the optical wafer does not move on the glass prior to exposing the assembly to the final UV cure. Two methods were used to gel the glue prior to final cure. The first was to expose the glued assembly to a low intensity, fiber optic UV source; a Dymax Blue Wave 200 with an 8 mm light guide. The fiber optic exit optics was placed at a height above the glued assembly that yielded a power reading of 44.2 mW/cm$^2$. The glued assembly was exposed to the low intensity UV for a period of 30 seconds to gel the glue prior to exposure to the higher intensity Dymax UV source used for final cure the glue. The second method was to expose the assembly to two 1.0 second flashes of the high intensity UV source prior to exposing the assembly to the same high intensity UV source for final cure. The two methods just described to gel the glue are referred to as a UV "Pre-flash". The latter method, using the Dymax high intensity lamp was preferred as it was found that the low intensity lamp could cause phase separation of some of the more reactive monomers with the lower intensity UV leading to a "Shimmer defect" with some glue formulations. After the pre-flash, the assembly was subjected to a final cure using a Dymax D3000 lamp with a metal doped Hg bulb. The typical power used was 85 mW/cm$^2$ for 60 seconds to produce a dose of 4.9 J/cm$^2$ UV-A.

Radiation Curing—"Pre-Flash" and Final Cure Using Photochromic Coated PC Wafers:

Addition of a photochromic coating layer to the convex powered PC wafer added one more layer of complexity as the photochromic coating absorbs most light in the UV to activate the photochromic dyes. Therefore, it was necessary to increase the photoinitiator level in the glue and use a higher dose of UV to adequately cure the glue using the Dymax lamp listed above, leading to increased heating of the assembly to upwards of 100° C. during the final cure. This was unacceptable for the process as it could lead to optical distortion of the assembly. Testing of a Xenon RC600 pulsed UV source revealed that shorter exposure times and reduced heat was possible to achieve the same cure state using the modified glue. The maximum temperature reached was ~54° C. after final cure. Both the "pre-flash" and the final cure were performed with the same Xenon RC600 lamp. With the glued assembly placed at a distance of 4.0 cm beneath the bulb, the pre-flash consisted of three 2 second UV exposures to gel the glue. The final cure, at the same distance from the bulb, consisted of three 20 second UV exposures for a total exposure time of 60 seconds. The measured UV dose of the final cure was similar to that of the Dymax D3000 lamp giving a total dose of 4.9 J/cm$^2$. It was necessary to allow the bulb to cool between exposures for optimum performance A 35 to 40 second cooling period between each 20 second exposure was introduced for consistent uniform cure.

As with the Dymax lamp, initial testing using the Xenon pulsed UV source revealed that using the same intensity for both the pre-flash and the final cure induced cylinder in the PC wafer. Therefore, two methods were employed to reduce the intensity during the pre-flash to eliminate the change in cylinder. The first was to place a piece of frosted glass between the UV bulb and the glued assembly during the pre-flash. The same exposure time was used and this effectively eliminated the induced cylinder. The second method was to simply increase the distance of the glued assembly from 4.0 cm to 6.5 cm during the pre-flash, using the original distance of 4.0 cm for the final cure.

4. Characterization

Adhesion:

Adhesion strength of the UV curable glue was tested using a Mecmesin compression tester. A 55 mm round PC wafer having a thickness of 1.0 mm was glued to a 50 mm round polished glass flat having a thickness of 2.0 mm. The PC/glass assembly was placed into a stainless steel ring such that the outer 2.5 mm of the PC wafer was supported by the ring with the glass side down. A 2 mm probe on the compression tester exerts increasing force on the polycarbonate, which is supported, until the glass either delaminates or breaks. The glass will break if the adhesion of the glue is stronger than the 2 mm glass. If the assembly withstands a force of 200N or greater prior to delaminating, or if the glass breaks due to substrate failure, the glue passes the adhesion test. All glues that passed this adhesion test were tested for delamination using a thermal shock test.

Thermal Shock:

The glued polycarbonate and glass assemblies were subjected to a 10 hour thermal shock test cycling from a freezer at −18° C. to an oven at 60° C. every thirty minutes for 10 hours. The assemblies were inspected for signs of delamination after each cycle. If the assemblies passed the thermal shock test with no delamination, they were tested for adhesion using the Mecmesin compression tester to see if there was any degradation of adhesion due to the thermal cycling.

Q-Sun:

The top glue candidates passing the compression test after the thermal shock test were exposed to 80 hour Q-Sun exposure. The glued assemblies were inspected for delamination and evolution of yellow index after 40 hour Q-Sun exposure and after 80 hour Q-Sun exposure.

Tropical Storage:

The top glue candidates that passed the compression test after the thermal shock test were also evaluated for delamination and evolution of yellowness after 1 week and after 1 month of tropical storage. Tropical storage conditions are 40° C. and 80% relative humidity.

5. Results

The requirements to be met for a successful glue formulation are as follows: Optical Clarity: Measured haze of less than 0.3% and transmission of greater than 90%; Ability to be cured by UV light passing through polycarbonate containing UV absorber blocking wavelengths shorter than 380 nm; Cured assembly must pass thermal shock testing cycling between −18° C. and +60° C. every 30 minutes for 10 hours with signs of defect or delamination; Cured assembly must pass compression testing such that the adhered glass shows no signs of delaminating when the adhered polycarbonate is subjected to increasing force by a steel probe exerting forces up to and including 200 Newtons or resulting in substrate failure (breaking of the adhered glass). Cured assembly must pass the above described compression test after passing the above described thermal shock test; Glue must be able to be cured by UV passing through both the polycarbonate containing UV absorber described above further coated with a UV absorbing photochromic coating.

The following non-limiting results illustrate working formulations comparatively to formulations not forming part of the present invention.

TABLE 2

Influence of choice of unsaturated oligomer

| UV Glue for PC Component | Component Name | 379-116-1* % | 379-116-2* % | 379-116-3* % | 379-116-4 % | 379-116-5* % |
|---|---|---|---|---|---|---|
| CN9018 | Urethane acrylate oligomer | 53.12 | — | 33.83 | 28.110 | 7.94 |
| CN9021 | Urethane acrylate oligomer | — | 66.67 | — | — | — |
| CN9031 | Urethane acrylate oligomer | — | — | 20.30 | — | — |
| CN972 | Urethane acrylate | — | — | — | 29.093 | 55.56 |
| HEMA | Hydroxyethyl methacrylate | 19.92 | 8.33 | 20.30 | 21.082 | 15.87 |
| SR-238 | 1,6-hexanediol diacrylate | 21.58 | 18.75 | 20.30 | 15.952 | 15.87 |
| Dar 1173/819 | Free Rad. Photoinitiators | 5.38 | 6.25 | 5.28 | 5.732 | 4.76 |
| Total | | 100.00 | 100.00 | 100.00 | 100.0 | 100.00 |
| Compression test | | 242 N delam. | 435 N delam. | discarded | >346 N | 181 N delam. |

*Comparative composition not forming part of the present invention

Table 2 shows that similar formulations only varying the unsaturated oligomers (raw materials beginning with CN are unsaturated oligomers) illustrates how the particular selection and ratio of unsaturated oligomer(s) was critical.

TABLE 3

Ratio of raw materials was critical to performance

| PC Glue | 383-59-3 | | 383-86-3 50% 59-3 + 50% IBOA | | 383-87-1* 86-3 w/o HEMA | | 383-87-2* 86-3 w/o HEMA & SR-339 | | 383-87-3* 86-3 w/o HEMA & SR-339 | |
|---|---|---|---|---|---|---|---|---|---|---|
| Component | % | Mass | % | Mass | % | Mass | % | Mass | % | Mass |
| CN966J75 (urethane acrylate) | 67.90 | 13.58 | 33.95 | 6.790 | 35.50 | 6.790 | 37.00 | 6.79 | 33.65 | 7.00 |
| Hydroxyethyl methacrylate | 8.73 | 1.75 | 4.365 | 0.873 | — | — | — | — | — | — |
| Phenoxy ethyl acrylate | 7.76 | 1.55 | 3.88 | 0.776 | 4.06 | 0.776 | — | — | — | — |
| Isobornyl acrylate | 7.76 | 1.55 | 53.88 | 10.776 | 56.34 | 10.776 | 58.72 | 10.78 | 62.50 | 13.00 |
| Darocur 1173 | 6.28 | 1.26 | 3.140 | 0.628 | 3.28 | 0.628 | 3.424 | 0.632 | 3.08 | 0.64 |
| Irgacure 819 | 1.57 | 0.314 | 0.785 | 0.157 | 0.82 | 0.157 | 0.856 | 0.158 | 0.77 | 0.16 |
| Total | 100 | 20.00 | 100 | 20.000 | 100 | 19.127 | 100.00 | 18.35 | 100.00 | 20.80 |
| Adhesion to Glass | Excellent | | Fair | | Poor | | Poor | | Poor | |
| Adhesion to PC | Excellent | | Fair | | Fair | | Poor | | Poor | |

*Comparative composition not forming part of the present invention

Table 3 shows that the addition of hydroxyethyl methacrylate increases adhesion to glass. Table 3 also shows that decreasing the concentration of phenoxyethyl acrylate reduces the adhesion to polycarbonate. Table 3 also shows that increasing concentration of isobornyl acrylate (IBOA) increases Tg of glue to a point that it can be removed such that treatment with hot water or flexing of PC causes delamination and the glue can be peeled from both substrates. These modifications can be made to convert a permanent adhesive to a temporary adhesive. Removal of hydroxyethyl methacrylate (HEMA) and phenoxyethyl acrylate (PEA) can reduce adhesion further. In other words, using exactly the same raw materials can result in success or failure depending on ratio chosen.

TABLE 4

Cure to clear polycarbonate

| PC Glue | Pre-flash | Shimmer? | comment | Final Cure | Cosmetics/ Comments | Thermal Shock | Cosmetic after TS | Compression aft. TS |
|---|---|---|---|---|---|---|---|---|
| 383-14-3 LB | 30 mW/cm2 26 sec | No | V. Nice | Dymax 60" | V. Nice—no cosmetic defects | OK | Nice | >451 N |

TABLE 4-continued

Cure to clear polycarbonate

| PC Glue | Pre-flash | Shimmer? | comment | Final Cure | Cosmetics/ Comments | Thermal Shock | Cosmetic after TS | Compression aft. TS |
|---|---|---|---|---|---|---|---|---|
| 383-14-4 LB | 30 mW/cm2 26 sec | No | | V. Nice | Dymax 60" | V. Nice—no cosmetic defects | OK | Nice | >408 N |
| 383-14-5 LB | 30 mW/cm2 26 sec | No | | V. Nice | Dymax 60" | V. Nice—no cosmetic defects | OK | Nice | >383 N |

TABLE 5

Cure to photochromic polycarbonate*

| PC Glue (vials) | Pre-flash | Shimmer? | comment | Final Cure | Cosmetics/Comments | Compression before TS |
|---|---|---|---|---|---|---|
| 383-14-3 LB | 30 mW/cm2 26 sec | No | wet V. Nice | Dymax 120" | V. Nice - no cosmetic defects/not fully cured | 62 N DELAM |
| 383-14-3 LB | 30 mW/cm2 52 sec | No | wet V. Nice | Dymax 180" | V. Nice - no cosmetic defects/not fully cured | 112 N DELAM |
| 383-14-4 LB | 30 mW/cm2 52 sec | No | wet V. Nice | Dymax 60" | V. Nice - no cosmetic defects/not fully cured | 84 N DELAM |
| 383-14-4 LB | 30 mW/cm2 52 sec | No | wet V. Nice | Dymax 120" | V. Nice - no cosmetic defects/not fully cured | 119 N DELAM |
| 383-14-4 LB | 30 mW/cm2 52 sec | No | wet V. Nice | Dymax 180" | V. Nice - no cosmetic defects/not fully cured | 147 N DELAM |
| 383-14-5 LB | 30 mW/cm2 52 sec | No | wet V. Nice | Dymax 60" | V. Nice - no cosmetic defects/not fully cured | 105 N DELAM |
| 383-14-5 LB | 30 mW/cm2 52 sec | No | wet V. Nice | Dymax 120" | V. Nice - no cosmetic defects/not fully cured | 114 N DELAM |
| 383-14-5 LB | 30 mW/cm2 52 sec | No | wet V. Nice | Dymax 180" | V. Nice - no cosmetic defects/not fully cured | 190 N DELAM |
| 383-19-4 LB | 30 mW/cm2 52 sec | No | wet V. Nice | Dymax 60" | V. Nice - no cosmetic defects/not fully cured | 102 N DELAM |

*Photochromic PC + 1.00 glued to glass using fibre optic pre-flash and Dymax final cure.

Table 4 and 5 show that formulations that work with clear polycarbonate failed to work with photochromic coated polycarbonate due to added UV absorption of coating and additional modification of photoinitiators was needed.

TABLE 6

Optimization to cure with photochromic polycarbonate

| | PC Glue | | | | |
|---|---|---|---|---|---|
| | 383-59-1 | 383-59-2 | 383-59-3 | 383-59-4 | 383-59-5 |
| | 383-19-4 + P.I. | 383-19-4 + P.I. | 383-19-4 + P.I. | 383-19-4 + P.I. | 383-19-4 + P.I. |
| Component | % | % | % | % | % |
| 383-19-4 | 99.00 | 98.00 | 97.00 | 96.00 | 95.00 |
| Dar 1173/819 (80:20) | 1.0000 | 2.0000 | 3.0000 | 4.0000 | 5.0000 |
| TOTAL | 100.00 | 100.00 | 100.00 | 100.00 | 100.00 |

TABLE 7

Cured photochromic polycarbonate testing

| PC Glue (modified 19-4) | Pre-flash | Final Cure | R-17 Cosmetics after thermal shock | Compression after TS | PASS/FAIL |
|---|---|---|---|---|---|
| 383-59-1 | Dymax 1 sec × 5 | Dymax 6 min. | delamination on edge | >389N | FAIL |
| 383-59-2 | Dymax 1 sec × 4 | Dymax 6 min. | delamination on edge | >385N | FAIL |
| 383-59-3 | Dymax 1 sec × 3 | Dymax 6 min. | Nice | >470N | PASS |
| 383-59-4 | Dymax 1 sec × 3 | Dymax 6 min. | Nice | >242N | PASS |
| 383-59-5 | Dymax 1 sec × 3 | Dymax 6 min. | Nice | >691N | PASS |

Tables 6 and 7 show that increasing the photoinitiator concentration was needed for successful cure through photochromic coated polycarbonate without delamination in thermal shock testing.

TABLE 8

"Shimmer defect" - Phase separation of Genomer 7151 reduced by adjusting Irgacure 819 concentration.

| | UV Glue for PC | | | |
|---|---|---|---|---|
| COMPONENT | 383-13-1 % | 383-13-2 % | 383-13-3 % | 383-13-4 % |
| CN966J75 | 59.00 | 52.80 | 52.80 | 52.80 |
| Genomer 7151 | — | 14.80 | 13.83 | 13.83 |
| HEMA | 10.00 | — | 10.00 | 13.00 |
| SR-339 PEA | 10.00 | 13.55 | — | 15.46 |
| IBOA | 15.70 | 13.55 | 18.46 | — |
| Dar 1173/819 | 5.30 | 5.30 | 4.91 | 4.91 |
| TOTAL | 100.00 | 100.0 | 100.00 | 100.00 |

TABLE 9

Uncoated PC flats glued to glass using the glues of Table 8 and fiber optic pre-flash and Dymax final cure.

| PC Glue (vials) | Pre-flash | Shimmer? | comment | Final Cure | Cosmetics/Comments |
|---|---|---|---|---|---|
| 383-13-1 | 30 mW/cm2 26 sec | No | Nice | Dymax 60" | V. Nice (no haze or shimmer) |
| 383-13-2 | 30 mW/cm2 26 sec | Bad Shimmer | No haze | Dymax 60" | No HEMA - Bad shimmer (No haze) |
| 383-13-3 | 30 mW/cm2 26 sec | No | light orange peel | Dymax 60" | No PEA - light haze |
| 383-13-4 | 30 mW/cm2 26 sec | No | Bad haze circle | Dymax 60" | No IBOA - Very Bad haze circle |

TABLE 10

"Shimmer Defect" - Phase separation of Genomer 7151.

| | UV Glue for PC | | | |
|---|---|---|---|---|
| COMPONENT | 383-19-1 % | 383-19-2 % | 383-19-3 % | 383-19-4 % |
| CN966J75 | 65.00 | 56.00 | 63.00 | 70.00 |
| Genomer 7151 | — | — | 6.70 | — |
| CN9031 | — | 8.00 | — | — |
| HEMA | 8.00 | 9.00 | 8.00 | 9.00 |
| SR-339 PEA | 8.70 | 9.00 | 8.00 | 8.00 |
| IBOA | 13.00 | 12.70 | 9.00 | 8.00 |
| Dar 1173/819 (80:20) | 5.30 | 5.30 | 5.30 | 5.00 |
| TOTAL | 100.0 | 100.00 | 100.00 | 100.00 |

TABLE 11

Testing of glues from Table 10.

| PC Glue | Compression before TS | Thermal Shock | Cosmetic aft. TS | Compresson after TS | Pass/Fail |
|---|---|---|---|---|---|
| 383-19-1 | 511N Break | | | | FAIL |
| 383-19-1 | | OK | Shimmer defect | 596N BREAK | FAIL |
| 383-19-1 | | OK | Shimmer defect | 713N BREAK | FAIL |
| 383-19-2 | 365N Break | | | | PASS |
| 383-19-2 | | OK | Nice | 443N BREAK | PASS |
| 383-19-2 | | OK | Nice | 243N BREAK | PASS |
| 383-19-3 | 545N Break | | | | FAIL |
| 383-19-3 | | OK | Shimmer defect | 377N BREAK | FAIL |
| 383-19-3 | | OK | Shimmer defect | 485N BREAK | FAIL |
| 383-19-4 | 396N Break | | | | PASS |
| 383-19-4 | | OK | Nice | 209N BREAK | PASS |
| 383-19-4 | | OK | Nice | 483N BREAK | PASS |

Tables 10 and 11 show that phase separation of some oligomers, such as Genomer 7151, can cause cosmetic defects. Surprisingly, minor variations with the same raw materials caused similar defects (i.e., 383-19-1 vs. 383-19-4).

TABLE 12

Effect of raw material selection on cosmetics.

| | | PC Glue | | | |
|---|---|---|---|---|---|
| COMPONENT | Component Name | 383-13-1 % | 383-13-2 % | 383-13-3 % | 383-13-4 % |
| CN966J75 | Urethane acrylate oligomer | 59.00 | 52.80 | 52.80 | 52.80 |
| Genomer 7151 | Polyester acrylate oligomer | — | 14.80 | 13.83 | 13.83 |
| HEMA | Hydroxyethyl methacrylate | 10.00 | — | 10.00 | 13.00 |
| SR-339 PEA | Phenoxyethyl acrylate | 10.00 | 13.55 | — | 15.46 |
| IBOA | Isobornyl acrylate | 15.70 | 13.55 | 18.46 | — |
| Dar 1173/819 | Free Radical Photoinitiators | 5.30 | 5.30 | 4.91 | 4.91 |
| TOTAL | | 100.00 | 100.0 | 100.00 | 100.00 |

TABLE 13

Testing of glues from Table 12.

| PC Glue (vials) | Pre-flash | Shimmer? | Other Defects? | Final Cure | Cosmetics/ Comments | Compression |
|---|---|---|---|---|---|---|
| 383-13-1 | 30 mW/cm2 26 sec | No | None | Dymax 60" | No 7151 - V. Nice (no haze or shimmer) | >350 N |
| 383-13-2 | 30 mW/cm2 26 sec | Bad Shimmer | None | Dymax 60" | No HEMA - Bad shimmer (No haze) | >541 N |
| 383-13-3 | 30 mW/cm2 26 sec | light orange peel | light orange peel | Dymax 60" | No PEA - llight haze | >459 N |
| 383-13-4 | 30 mW/cm2 26 sec | Bad haze circle | Bad haze | Dymax 60" | No IBOA - Very Bad haze circle | >437 N |

Table 12 and 13 show that elimination of Genomer 7151 can correct some cosmetic issues. This material can also phase separate during cure.

TABLE 14

Influence of photoinitiator type and concentration on cosmetics.

| Modifications of 379-198-1 Component | 383-3-1 % | 383-3-2 % | 383-3-3 % | 383-3-4 % | 383-3-5 % | 383-3-6 % | 383-3-7 % | 383-3-8 % |
|---|---|---|---|---|---|---|---|---|
| 379-198-1 | 95.20 | 94.70 | 94.20 | 93.70 | 95.20 | 94.70 | 94.20 | 93.70 |
| Darocur 1173 | 3.84 | 4.24 | 4.64 | 5.04 | 4.32 | 4.77 | 5.22 | 5.67 |
| Irgacure 819 | 0.96 | 1.06 | 1.16 | 1.26 | 0.48 | 0.53 | 0.58 | 0.63 |
| Total | 100.00 | 100.00 | 100.00 | 100.00 | 100.00 | 100.00 | 100.00 | 100.00 |

TABLE 15

Uncoated PC flats glued to glass using the glues from Table 14 and fiber optic pre-flash and Dymax final cure.

| PC Glue (vials) | Pre-flash | Shimmer? | comment | Final Cure |
|---|---|---|---|---|
| 383-3-1 | 30 mW/cm2 26 sec | No | light haze in center | Dymax 60" |
| 383-3-2 | 30 mW/cm2 26 sec | No | light haze in center | Dymax 60" |
| 383-3-3 | 30 mW/cm2 26 sec | No | light haze in center | Dymax 60" |
| 383-3-4 | 30 mW/cm2 26 sec | No | light haze in center | Dymax 60" |
| 383-3-5 | 30 mW/cm2 26 sec | No | Nice - No haze | Dymax 60" |
| 383-3-6 | 30 mW/cm2 26 sec | No | Nice - No haze | Dymax 60" |
| 383-3-7 | 30 mW/cm2 26 sec | No | Very light haze in center | Dymax 60" |
| 383-3-8 | 30 mW/cm2 26 sec | No | Very light haze in center | Dymax 60" |

Tables 14 and 15 shows haze created by low intensity UV pre-flash was linked to the concentration of Irgacure 819.

6. Results

Many prospective UV (or radiation) curable glues were formulated using a variety of free radically curable raw materials ranging from acrylic and methacrylic monomers to urethanes, urethane acrylates, as well as polyester oligomers. After much testing, several materials were identified that exhibited better adhesion to glass than PC and other materials that adhered better to PC than glass. Combining these materials in the correct ratio, lead to several formulations that passed the compression adhesion test shown in Table 16 and Table 17.

TABLE 16

Glue formulation passing compression after thermal shock testing.

| Component Common Name | Component Chemical Name | 383-17-1 % by Mass | 383-17-2 % by Mass | 383-19-1 % by Mass | 383-19-2 % by Mass | 383-19-3 % by Mass | 383-19-4 % by Mass |
|---|---|---|---|---|---|---|---|
| CN750 | Chlorinated Polyester Oligomer | 14.80 | | | | | |
| CN790 | Acrylated Polyester Oligomer | | 14.80 | | | | |
| CN9031 | Urethane Acrylate | | | | 8.00 | | |
| CN966J75 | Urethane Acrylate | 52.08 | 52.08 | 65.00 | 56.00 | 63.00 | 70.00 |
| Genomer 7151 | Carboxy Functional Polyester | | | | | 6.70 | |
| SR-339 | Phenoxyethyl Acrylate | 9.50 | 9.50 | 8.70 | 9.00 | 8.00 | 8.00 |
| SR-506 | Isobornyl Acrylate | 9.50 | 9.50 | 13.00 | 12.70 | 9.00 | 8.00 |
| HEMA | Hydroxyethyl Methacrylate | 8.10 | 8.10 | 8.00 | 9.00 | 8.00 | 9.00 |
| Darocur 1173 | 2-Hydroxy-2-methyl-1-phenyl-1-propanone | 4.24 | 4.24 | 4.24 | 4.24 | 4.24 | 4.00 |
| Irgacure 819 | Phenylbis(2,4,6-trimethyl benzoyl)phosphine Oxide | 1.06 | 1.06 | 1.06 | 1.06 | 1.06 | 1.00 |
| Cosmetics | | Nice | Nice | Nice | Nice | Nice | Nice |
| Compression before thermal shock | | Not Tested | Not Tested | Pass | Pass | Pass | Pass |
| Thermal Shock | | Pass | Pass | Pass | Pass | Pass | Pass |
| Compression after Thermal shock | | Pass | Pass | Pass | Pass | Pass | Pass |

TABLE 17

Glue formulation modified to cure through photochromic coating.

| Photoinitiator Component Common Name | Component Chemical Name | Control 5% 383-19-4 % by Mass | ~6% 383-59-1 % by Mass | ~7% 383-59-2 % by Mass | ~8% 383-59-3 % by Mass | ~9% 383-59-4 % by Mass | ~10% 383-59-5 % by Mass |
|---|---|---|---|---|---|---|---|
| CN966J75 | Urethane Acrylate | 70.00 | 69.30 | 68.60 | 67.90 | 67.20 | 66.50 |
| SR-339 | Phenoxyethyl Acrylate | 8.00 | 7.92 | 7.84 | 7.76 | 7.68 | 7.60 |
| SR-506 | Isobornyl Acrylate | 8.00 | 7.92 | 7.84 | 7.76 | 7.68 | 7.60 |
| HEMA | Hydroxyethyl Methacrylate | 9.00 | 8.91 | 8.82 | 8.73 | 8.64 | 8.55 |
| Darocur 1173 | 2-Hydroxy-2-methyl-1-phenyl-1-propanone | 4.00 | 4.76 | 5.52 | 6.28 | 7.04 | 7.80 |
| Irgacure 819 | Phenylbis(2,4,6-trimethyl benzoyl)phosphine Oxide | 1.00 | 1.19 | 1.38 | 1.57 | 1.76 | 1.95 |
| Cosmetics | | Nice | Nice | Nice | Nice | Nice | Nice |
| Compression before thermal shock | | >396 N | >742 N | >562 N | >566 N | >592 N | >466 N |
| Thermal Shock | | Pass | Pass | Pass | Pass | Pass | Pass |
| Compression after Thermal shock | | >483 N | >322 N | >250 N | >512 N | >319 N | >338 N |

Figure 3:
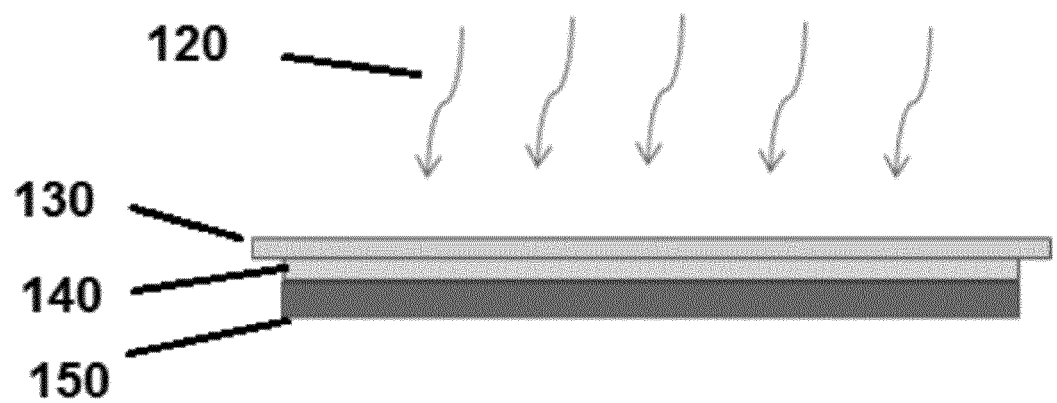
FIG. 3 is a drawing showing an uncoated PC wafer glued to glass.

As illustrated in FIG. 3, the optimized formulations 140 were tested with both coated and uncoated 55 mm flat round clear polycarbonate wafers 130 glued by UV radiation 120 to 50 mm flat round glass discs 150 having a thickness of 2 mm 0. These formulations exhibited good cosmetics, passed the compression test for adhesion after cure, passed the thermal shock cycling test without signs of delaminating, and also passed the compression test after the thermal shock test. These assemblies were cured (both the pre-flash and the final cure) using a Dymax D3000 UV lamp. The pre-flash to gel the glue consisted of 2 one second pulses followed by the final cure of 60 seconds. The best glue formulations selected based on viscosity, cosmetics and cure for the clear polycarbonate wafers were also evaluated for delamination and evolution of yellow index during the 80 hr. Q-Sun accelerated the aging and tropical storage test. The results of one example in these tests can be seen in Tables 18 and 19.

TABLE 18

Q-Sun results for 383-19-4 (glass/glue/NTPC coated PC wafer).

| | Sample | | | | |
|---|---|---|---|---|---|
| | 1 | 2 | 3 | 4 | 5 |
| Y.I.D. = T$_0$ | 1.66 | 1.75 | 1.74 | 1.79 | 1.66 |
| Y.I.D. = 40 hr. | 1.70 | 1.66 | 1.73 | 1.65 | 1.65 |
| Y.I.D. = 80 hr. | 1.90 | 2.03 | 2.02 | 1.92 | 1.89 |
| Delamination 40 hr. | None | None | None | None | None |
| Delamination 80 hr. | none | None | None | None | None |

TABLE 19

Tropical Storage Results for 383-19-4 (glass/glue/NTPC coated PC wafer).

| | Sample | | | | |
|---|---|---|---|---|---|
| | 1 | 2 | 3 | 4 | 5 |
| Y.I.D. = T$_0$ | 1.68 | 1.54 | 1.58 | 1.56 | 1.49 |
| Y.I.D. = 1 week | 1.52 | 1.57 | 1.54 | 1.58 | 1.46 |
| Y.I.D. = month | 1.56 | 1.62 | 1.72 | 1.67 | 1.63 |
| Delamination 1 week | None | None | None | None | None |
| Delamination 1 month | none | None | None | None | None |

Figure 4:
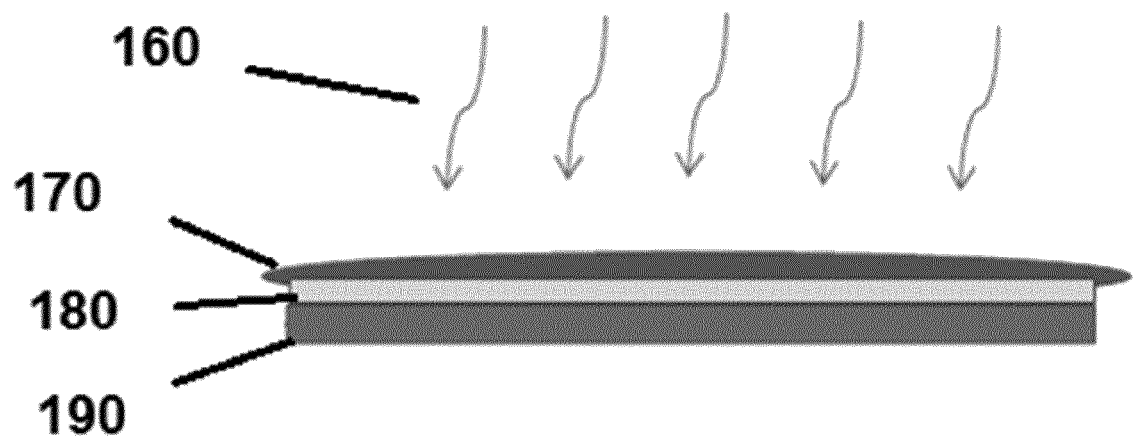
FIG. 4 is a drawing showing a photochromic coated PC wafer glued to glass.

As seen in the tables above, there was very little evolution of yellow index during Q-Sun and no evolution during tropical storage and adhesion was consistent through both tests. Addition of a photochromic coating to the polycarbonate wafer, absorbed additional UV and, therefore, required a longer exposure for both the pre-flash and the final cure to cure the same glue. Two different configurations were tested to evaluate the cure needed to adequately cure the glue so that the assemblies could pass the required tests. FIG. 4 is an illustration of an assembly using a photochromic coated PC wafer 170 glued with adhesive 180 by UV radiation 160 to a glass disc 190. Table 20 illustrates the time needed to cure the assembly compared to that needed using a clear wafer.

TABLE 20

| UV source | Dymax | Dymax | Dymax | Dymax | Dymax |
|---|---|---|---|---|---|
| Glue reference | 383-19-4 | 383-19-4 | 383-19-4 | 383-19-4 | 383-19-4 |
| Photoinitiator concentration | 5% | 5% | 5% | 5% | 5% |
| Pre-flash to gel glue | 1 sec × 2 | 1 sec × 6 | 1 sec × 6 | 1 sec × 6 | 1 sec × 6 |
| UV cure time | 60 sec | 180 sec | 360 sec | 540 sec | 720 sec |
| Thermal Shock test | Delaminated | Delaminated | Pass | Pass | Pass |
| Compression test | Not cured | 170N Delam | >330N | >351N | >325N |

Figure 5:
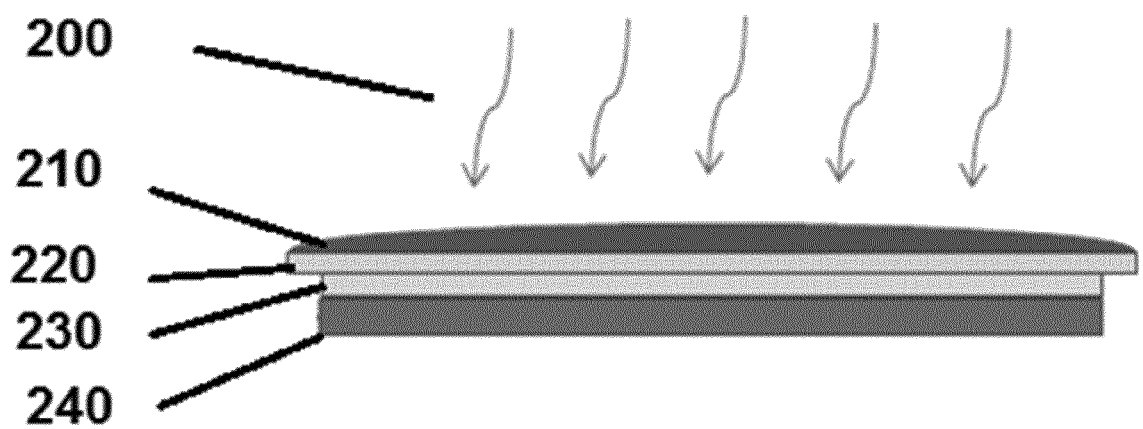
FIG. 5 is a drawing showing a photochromic coated wafer on top of an uncoated PC wafer glued to glass.

As shown in Table 20, the pre-flash needed to be increased to six 1 second flashes and the final cure needed to be increased from 1 minute (60 sec) to 6 minutes (360 sec) to adequately cure the glue through a photochromic coated PC wafer to pass both the thermal shock and compression test using the glue selected for the clear wafers. The second configuration tested was to place a photochromic coated wafer on top of a clear flat PC wafer normally used to test compression testing. FIG. 5 is an illustration of an assembly using a photochromic coated PC wafer 210 on top of a clear PC wafer 220 glued with adhesive 230 by UV radiation 200 to a glass disc 240. This configuration was used to test modifications of the preferred formulation having increasing photoinitiator levels to reduce the cure time needed. These formulations are listed in Table 22. The results of this testing are listed in Table 21.

TABLE 21

| UV source | Dymax | Dymax | Dymax | Dymax | Dymax | Dymax |
|---|---|---|---|---|---|---|
| Glue reference | 383-19-4 | 383-59-1 | 383-59-2 | 383-59-3 | 383-59-4 | 383-59-5 |
| Photoinitiator conc. | 5% | ~6% | ~7% | ~8% | ~9% | ~10% |
| Pre-flash to gel glue | 1 sec × 5 | 1 sec × 5 | 1 sec × 4 | 1 sec × 3 | 1 sec × 3 | 1 sec × 3 |
| UV cure time | 360 sec | 360 sec | 360 sec | 360 sec | 360 sec | 360 sec |
| Thermal Shock test | Delaminated | Delaminated | Delaminated | Pass | Pass | Pass |
| Compression test | >264 N | >389 N | >385 N | >470 N | >242 N | >394 N |

The formulations that safely passed all tests even when cured through two PC wafers were further evaluated using only a photochromic coated PC wafer as seen in FIG. 4. This configuration was also tested through thermal cycling and compression testing after thermal cycling. The results are highlighted in Table 22.

TABLE 22

| UV source | Dymax | Dymax | Dymax | Dymax | Dymax | Dymax |
|---|---|---|---|---|---|---|
| Glue reference | 383-19-4 | 383-59-1 | 383-59-2 | 383-59-3 | 383-59-4 | 383-59-5 |
| Photoinitiator conc. | 5% | ~6% | ~7% | ~8% | ~9% | ~10% |
| Pre-flash to gel glue | 1 sec × 5 | 1 sec × 5 | 1 sec × 4 | 1 sec × 3 | 1 sec × 3 | 1 sec × 3 |
| UV cure time | 360 sec | 360 sec | 360 sec | 360 sec | 360 sec | 360 sec |
| Thermal Shock test | Pass | Pass | Pass | Pass | Pass | Pass |
| Compression test | 179 N Delaminated | >332 N | >250 N | >332 N | >319 N | >338 N |

While all glues passed thermal shock testing, the increased photoinitiator concentration insures good compression testing (adhesion) after thermal shock testing. However, the temperature reached using the Dymax lamp with a 360 second cure time approached 80° C. to 100° C. This temperature is unacceptable as it can induce cylinder and sphere into the thin optical wafers. Therefore, other UV sources were tested that would not generate as much heat. It was found that the higher intensity of a Xenon RC600 pulsed UV system was able to cure the same glue through photochromic coated wafers in a shorter time and with much less heat generated. Initial trials using the Xenon lamp were made using the configuration in FIG. 5 with a photochromic +1.00 wafer on top of a clear PC flat. The time needed to gel the glue and to cure the glue were evaluated using the compression test. See results in Table 23.

TABLE 23

| Xenon RC600 Cure Trials. | | | | |
|---|---|---|---|---|
| UV source | Xenon RC600 | Xenon RC600 | Xenon RC600 | Xenon RC600 |
| Glue reference | 383-59-3 | 383-59-3 | 383-59-3 | 383-59-3 |

TABLE 23-continued

| Xenon RC600 Cure Trials. | | | | |
|---|---|---|---|---|
| Photoinitiator conc. | ~8% | ~8% | ~8% | ~8% |
| Pre-flash to gel glue | 2 sec × 3 | 2 sec × 3 | 2 sec × 3 | 1 sec × 5 |
| UV cure time | 30 sec | 30 sec × 2 | 30 sec × 3 | 25 sec × 5 |
| Compression test | 313 Delaminated | >618N | >455N | >363N |

Exposure time was limited to 25 seconds or less with at least a 30 second cooling period between exposures. Because a 60 second cure in the initial trials gave passing adhesion results, more comprehensive testing was conducted using both 50 sec (25 sec×2) and 60 sec (20 sec×3) using this glue formulation in both configurations (FIGS. 4 and 5). Testing revealed tiny bubbles formed during the thermal shock test in some of the assemblies cured for 50 sec (25 sec×2). See the results in Table 24. While all assemblies passed the compression test after the thermal shock test, two of the three assemblies cured for 50 seconds displayed tiny bubbles after the thermal shock test, possibly indicating incomplete cure. The adhesive in samples cured for 60 seconds was evaluated by FTIR and determined to be fully cured showing no unsaturation.

TABLE 24

| Xenon RC600 Cure Trials. | | | | |
|---|---|---|---|---|
| UV source | Xenon RC600 | Xenon RC600 | Xenon RC600 | Xenon RC600 |
| Glue reference | 383-59-3 | 383-59-3 | 383-59-3 | 383-59-3 |
| Wafers used | FIG. 5 | FIG. 4 | FIG. 5 | FIG. 4 |
| Pre-flash to gel glue | 2 sec × 3 | 2 sec × 3 | 2 sec × 3 | 2 sec × 3 |
| UV cure time | 20 sec × 3 | 25 sec × 2 | 25 sec × 2 | 20 sec × 3 |
| Number of assemblies | 3 | 3 | 3 | 3 |
| Cosmetic after thermal shock | Nice (all 3) | Delam. bubbles (2) | Nice (all 3) | Nice (all 3) |
| Compression test (ave) | >412N | Not tested | >444N | Not tested |

An additional 9 assemblies were made with photochromic coated wafers (FIG. 4) using the same pre-flash and final cure conditions and all passed both thermal shock and compression after thermal shock testing with no defects. These conditions are shown in table 25.

TABLE 25

| Xenon RC600 Evaluations. | |
|---|---|
| UV source | Xenon RC600 Pulsed UV |
| Glue Reference | 383-59-3 |
| Wafer type | PC with Transitions ® Signature VII Photochromics |
| Number of assemblies | 9 |
| Pre-flash to gel glue | 2 sec × 3 (6 sec) |
| Pre-flash Intensity, Dose UV-A | 0.096 W/cm$^2$, 0.469 J/cm$^2$ |
| Pre-flash Intensity UV-B | 0.094 W/cm$^2$, 0.459 J/cm$^2$ |
| Pre-flash Intensity UV-C | 0.017 W/cm$^2$, 0.080 J/cm$^2$ |
| Pre-flash Intensity UV-V | 0.065 W/cm$^2$, 0.333 J/cm$^2$ |
| Final cure | 20 sec × 3 (60 sec) |
| Final cure intensity, Dose UV-A | 0.102 W/cm$^2$, 4.842 J/cm$^2$ |
| Final cure intensity, Dose UV-B | 0.100 W/cm$^2$, 4.774 J/cm$^2$ |
| Final cure intensity, Dose UV-C | 0.017 W/cm$^2$, 0.546 J/cm$^2$ |
| Final cure intensity, Dose UV-V | 0.067 W/cm$^2$, 3.256 J/cm$^2$ |
| Thermal shock test | All 9 assemblies Pass - no delamination |
| Cosmetics after thermal shock | Pass (all 9 assemblies) |
| Compression after thermal shock | Pass (all 9 assemblies) |

The invention claimed is:

1. A photocurable adhesive, comprising:
   a) at least one urethane acrylate oligomer, in an amount ranging from 50 to 75 wt. %;
   b) at least one alkyl acrylate or diacrylate monomer, in an amount ranging from 10 to 25 wt. %;
   c) at least one hydroxy-functional acrylic monomer, in an amount ranging from 8 to 25 wt. %; and
   d) at least one free-radical generating initiator, in an amount ranging from 5 to 9.5 wt %.

2. The photocurable adhesive of claim 1, wherein the urethane acrylate oligomer is selected from the group consisting of aliphatic urethane acrylate oligomers, aliphatic polyether based urethane acrylate oligomers, aromatic polyether based urethane acrylate oligomers, and aliphatic polyester based urethane acrylate oligomers.

3. The photocurable adhesive of claim 1, wherein the at least one alkyl acrylate or diacrylate monomer is selected from the group consisting of isobornyl acrylate (IBOA), isobornyl methacrylate (IBMA), 1,6-hexanediol diacrylate (HDDA), and phenoxyethyl acrylate (PEA).

4. The photocurable adhesive of claim 1, wherein the at least one hydroxy-functional acrylate monomer is selected from the group consisting of hydroxyethyl methacrylate (HEMA), hydroxyethyl acrylate (HEA), hydroxypropyl methacrylate (HPMA), and hydroxypropyl acrylate (HPA).

5. The photocurable adhesive of claim 1, wherein the at least one free radical generating initiator is a photoinitiator.

6. The photocurable adhesive of claim 5, wherein the photoinitiator is selected from the group consisting of benzophenone derivatives and acetophenone derivatives.

7. The photocurable adhesive of claim 6, wherein a ratio of benzophenone derivatives to acetophenone derivatives is between 70:30 and 90:10.

8. The photocurable adhesive of claim 1, wherein the amount of said urethane acrylate oligomer ranges from 52 to 70 wt. % relatively to the total amount of said photocurable adhesive.

9. The photocurable resin adhesive of claim 1, wherein the amount of said alkyl acrylate or diacrylate monomer ranges from 15 to 22 wt. % relatively to the total amount of said photocurable adhesive.

10. The photocurable adhesive of claim 1, wherein the amount of said hydroxy-functional acrylic monomer ranges from 8 to 10 wt. % relatively to the total amount of said photocurable adhesive.

11. The photocurable adhesive of claim 1, wherein the adhesive is substantially free of solvent.

12. The photocurable adhesive of claim 1, wherein the adhesive comprises an optional polyester oligomer.

13. The photocurable adhesive of claim 12, wherein the optional polyester oligomer is selected from the group consisting of a chlorinated polyester oligomer and an acrylated polyester oligomer.

14. A method to prepare an optical article, comprising:
   a) applying the photocurable adhesive of claim 1 to a first face of a polycarbonate substrate and to a first face of a glass substrate;
   b) joining the adhesive of the first face of the polycarbonate substrate and the adhesive of the first face of the glass substrate horizontally such that the polycarbonate substrate is above the glass substrate;
   c) allowing the adhesive to spread under the weight of the polycarbonate substrate until the adhesive fills the space between the substrate faces;
   d) applying a first UV radiation through the polycarbonate substrate for a period of time to gel the photocurable adhesive; and
   e) applying a second UV radiation through the polycarbonate substrate for a period of time to set the photocurable adhesive.

15. An optical article, prepared by the method of claim 14.

* * * * *